United States Patent
Hayakawa et al.

(10) Patent No.: US 10,023,347 B2
(45) Date of Patent: *Jul. 17, 2018

(54) SYNTHETIC RESIN CONTAINER HAVING INVERTED, FOLDED BACK BOTTOM WALL

(71) Applicant: YOSHINO KOGYOSHO CO., LTD., Tokyo (JP)

(72) Inventors: Shigeru Hayakawa, Tokyo (JP); Yoshiharu Kitamura, Tochigi (JP); Kazuo Suzuki, Tokyo (JP)

(73) Assignee: YOSHINO KOGYOSHO CO., LTD., Tokyo (JP)

( * ) Notice: Subject to any disclaimer, the term of this patent is extended or adjusted under 35 U.S.C. 154(b) by 336 days.

This patent is subject to a terminal disclaimer.

(21) Appl. No.: 14/606,554

(22) Filed: Jan. 27, 2015

(65) Prior Publication Data

US 2015/0136798 A1    May 21, 2015

Related U.S. Application Data

(60) Division of application No. 14/091,746, filed on Nov. 27, 2013, now Pat. No. 9,238,521, which is a division
(Continued)

(30) Foreign Application Priority Data

Dec. 25, 2008  (JP) .................................. 2008-330322
Dec. 26, 2008  (JP) .................................. 2008-333028
(Continued)

(51) Int. Cl.
B65D 8/08          (2006.01)
B65D 1/40          (2006.01)
(Continued)

(52) U.S. Cl.
CPC ............ *B65D 1/40* (2013.01); *B05B 11/3047* (2013.01); *B65D 1/0261* (2013.01);
(Continued)

(58) Field of Classification Search
CPC ...... B65D 1/40; B65D 1/0292; B65D 1/0261; B65D 1/0276; B65D 83/00;
(Continued)

(56) References Cited

U.S. PATENT DOCUMENTS 1,762,903 A    6/1930   Werder
3,949,034 A    4/1976   Uhlig
(Continued)

FOREIGN PATENT DOCUMENTS

CN          1050854 A      4/1991
CN          1238730 A      12/1999
(Continued)

OTHER PUBLICATIONS

Sep. 8, 2015 Extended European Search Report issued in European Application No. 15166120.4.
(Continued)

*Primary Examiner* — Anthony Stashick
*Assistant Examiner* — James M Van Buskirk
(74) *Attorney, Agent, or Firm* — Oliff PLC

(57) ABSTRACT

Disclosed is a synthetic resin container provided with an inverting, foldback bottom wall that can maintain a stable, self-supporting position while being able to minimize the amount of residual contents, and that can be formed by blow-molding, etc., and maintain the favorable producibility or low cost of the past. The synthetic resin container is provided with a bottom wall that forms the bottom of the container, and a drum section that is united to the perimeter of the bottom wall and forms a filling space M for contents on the inside, and is a synthetic resin container wherein a
(Continued)

raised bottom is formed by inverting and folding back said bottom wall toward said drum section. Said drum section has a lower peripheral wall that touches or approaches the outer wall part of said bottom wall and forms a self-supporting base by the inversion and folding back of said bottom wall.

4 Claims, 18 Drawing Sheets

Related U.S. Application Data of application No. 13/845,601, filed on Mar. 18, 2013, now Pat. No. 8,746,494, which is a continuation of application No. 13/141,260, filed as application No. PCT/JP2009/007210 on Dec. 24, 2009, now Pat. No. 8,505,763.

(30) Foreign Application Priority Data

Dec. 26, 2008 (JP) ................................ 2008-334557
Sep. 30, 2009 (JP) ................................ 2009-228571

(51) Int. Cl.
  *B65D 1/02* (2006.01)
  *B65D 83/00* (2006.01)
  *B05B 11/00* (2006.01)
  *B29C 49/00* (2006.01)
  *B29L 31/00* (2006.01)

(52) U.S. Cl.
  CPC ......... *B65D 1/0276* (2013.01); *B65D 1/0292* (2013.01); *B65D 83/00* (2013.01); *B05B 11/0037* (2013.01); *B29C 49/00* (2013.01); *B29L 2031/7158* (2013.01); *B65D 2231/008* (2013.01)

(58) Field of Classification Search
  CPC .. B65D 2231/008; B65D 11/20; B65D 11/22; B65D 11/24; B65D 1/0284; B05B 11/3047; B05B 11/0037; B29C 49/00; B29L 2031/7158
  USPC ....................................................... 220/608
  See application file for complete search history.

(56) References Cited

U.S. PATENT DOCUMENTS

| | | | |
|---|---|---|---|
| 4,264,017 A | 4/1981 | Karas et al. | |
| 4,436,216 A | 3/1984 | Chang | |
| 4,542,029 A | 9/1985 | Caner et al. | |
| 4,836,398 A | 6/1989 | Leftault, Jr. et al. | |
| 5,117,878 A | 6/1992 | Shaw et al. | |
| 5,518,150 A | 5/1996 | Witt, Jr. | |
| 6,083,392 A | 7/2000 | Rigney | |
| 6,942,166 B2 | 9/2005 | Tanimoto | |
| 7,552,833 B2 * | 6/2009 | Tsutsui | B65D 1/0223 215/381 |
| 7,900,425 B2 | 3/2011 | Bysick et al. | |
| 8,584,879 B2 * | 11/2013 | Melrose | B29C 49/06 215/373 |
| 2008/0302831 A1 | 12/2008 | Wang | |
| 2009/0291174 A1 * | 11/2009 | Lewis | B32B 27/32 426/399 |

FOREIGN PATENT DOCUMENTS

| | | |
|---|---|---|
| CN | 1245467 A | 2/2000 |
| CN | 1611421 A | 5/2005 |
| EP | 0615911 A1 | 9/1994 |
| JP | S53-131952 U | 10/1978 |
| JP | H02-099712 | 8/1990 |
| JP | H0540187 U | 5/1993 |
| JP | 3004181 U | 11/1994 |
| JP | H08-230961 A | 9/1996 |
| JP | H08-244749 A | 9/1996 |
| JP | H11-349070 A | 12/1999 |
| JP | 2000159249 A | 6/2000 |
| JP | 2008239176 A | 10/2008 |
| JP | 2008280074 A | 11/2008 |
| JP | 2008290751 A | 12/2008 |
| WO | 88005747 A2 | 8/1988 |

OTHER PUBLICATIONS

Sep. 16, 2015 Office Action issued in European Application No. 09 834 483.1.
International Search Report issued in International Application No. PCT/JP2009/007210 dated Mar. 30, 2010.
Aug. 31, 2012 Office Action issued in Chinese Patent Application No. 200980157483.3.
Canadian Office Action dated Nov. 27, 2012 for Canadian Application No. 2,748,564.
Australian Office Action dated Feb. 26, 2013 in Australian Application No. 2009332244.
Korean Office Action dated Mar. 19, 2013 in Korean Application No. 10-2011-7015598.
May 28, 2013 Office Action issued in Japanese Patent Application No. 2009-228571.
Jun. 17, 2013 Extended Search Report issued in European Patent Application No. 09834483.1.
Aug. 30, 2013 Office Action issued in U.S. Appl. No. 13/845,601.
Jun. 30, 2014 Office Action issued in Chinese Patent Application No. 201310012261.0.
Jul. 1, 2014 Office Action issued in Chinese Patent Application No. 201310012060.0.
Feb. 27, 2015 Office Action issued in European Patent Application No. 09 834 483.1.
May 27, 2015 Non-Final Rejection issued in U.S. Appl. No. 14/091,746.

* cited by examiner

SYNTHETIC RESIN CONTAINER HAVING INVERTED, FOLDED BACK BOTTOM WALL

This is a Divisional of application Ser. No. 14/091,746 filed Nov. 27, 2013, which is a Divisional of application Ser. No. 13/845,601 filed Mar. 18, 2013, now U.S. Pat. No. 8,746,494, issued Jun. 10, 2014, which is a Continuation of application Ser. No. 13/141,260 filed Aug. 1, 2011, now U.S. Pat. No. 8,505,763, issued on Aug. 13, 2013. The disclosures of the prior applications are hereby incorporated by reference herein in their entirety.

TECHNICAL FIELD

The present invention relates to a synthetic resin container formed by a blow molding, an injection molding and the like, in which a bottom wall of the container is inverted and folded back toward the inside of a body, and relates particularly to a container suitable as a container for a pump.

RELATED ART

As a synthetic resin container for containing shampoo, conditioner, detergent, deodorizing and disinfecting agent, cosmetic and the like, various kinds of containers are commercially available, which have a discharging device such as a pump by which an appropriate amount of content in the container can be extracted. Further, it has become common that, after the content in the container is entirely consumed, the original container (container to be refilled) is reused, by replenishing a new content from a commercially available refill container. By using such a container, resources are effectively reused (see, for example, Japanese Patent Application Laid-open No. 2000-159249, and Japanese Patent Application Laid-open No. 8-230961).

The container described in these references has a mouth and neck portion standing upright from an upper end of a body portion with a bottomed cylindrical shape via a shoulder portion, and is entirely integrally formed. Further, a central region of a bottom portion is raised to form an annular recessed region around the central region of the bottom portion. In general, such a container is often formed by blow molding, and in this case, the center region of the bottom portion tends to rise due to pinch off of the bottom potion.

Preferably, a general container such as described in these references is formed by blow molding for the purpose of favorable productivity, reduction in cost and the like. In this case, however, the central region of the bottom portion described above tends to rise, and hence, there is a possibility that liquid remains in the annular recessed region around the central region. A discharging device such as a pump used with this type of a container is configured such that a sucking pipe is installed vertically in the container, and the lower end of the sucking pipe has an opening in the vicinity of the bottom surface to suck liquid through the opening. If the opening of the sucking pipe is located above the raised region, liquid existing around the raised region remains to be unsucked. Further, even if the sucking pipe is configured to be curved so as to place the opening of the pipe at the periphery of the bottom portion of the container, the liquid often remains in recessed region due to an angle of the tip end of the pipe or the diameter of the pipe or a width of the recess around the raised region.

As one example, the references described above disclose an idea that: a sucking pipe connecting with a sucking port of a pump is bent in the middle of the pipe; a lower end of the pipe is positioned at an edge portion of a bottom wall corresponding to a connection portion with a lower end of a body of the container; and, the content remaining in the container is collected at the edge portion of the bottom wall by inclining the container or other manner, thereby discharging the remaining content. However, it is burdensome for a user to discharge the content while inclining the container, and usability thereof is not good.

Further, forming a container body by means of a molding method capable of giving complicated shapes such as the injection molding, the bottom portion can be shaped relatively freely, whereby it is possible to eliminate the remaining liquid. However, this may cause other problems such as higher cost, lower productivity and the like.

DISCLOSURE OF THE INVENTION

Problems to be Solved by the Invention

An object of the present invention is to propose a synthetic resin container having an inverted and folded back bottom wall capable of securing a stable self-standing position; minimizing the remaining amount of content; being formed by blow molding and the like; and maintaining the existing favorable productivity or low cost.

Means for Solving the Problem

The present invention relates to a synthetic resin container which is formed integrally with a synthetic resin, can be formed especially by means of blow molding and the like, and includes a bottom wall for forming a bottom portion of the container, and a body portion connecting integrally with an outer periphery of the bottom wall to define a space for filling a content therein, the bottom wall being inverted and folded back toward the inside of the body portion to form a raised bottom, wherein the body portion has a lower peripheral wall for forming a self-standing foot by inverting and folding back the bottom wall to bring the lower peripheral wall into contact with or place the lower peripheral wall in proximity to an outer-side wall portion of the bottom wall, and a bending groove is provided at a boundary between the body portion and the bottom wall serving as a starting point for inverting and folding back the bottom wall, the bending groove being protruded outwardly from the bottom portion and defining an annular hollow portion therein after inverting and folding back the bottom wall. The bending groove has a cross section of a rounded U-shape or a squared U-shape.

In the synthetic resin container having the configuration described above, it is preferable that the body portion has a narrowed portion (recessed portion) formed around the entire circumference of a lower peripheral wall of the body portion so as to protrude toward the inside of the body portion, and, it is also preferable that the bottom wall has an annular rib (in a shape that protrudes to the inside of the body portion) brought into contact with the inner surface of a lower peripheral wall of the narrowed portion to form a seal portion between the narrowed portion and the annular rib after inverting and folding back the bottom wall.

Further, the hollow portion described above desirably has a larger diameter than that of the body portion. This makes it possible to stabilize the self-standing position of the container.

The bottom wall of the container may be formed by a slanting wall having an edge at the highest position and a liquid pool at a center region thereof. The bottom wall may also have a plurality of ribs directed toward the liquid pool of the bottom wall, each of the ribs having a protruding shape on the undersurface located on the outer side of the container and a recessed shape on the upper surface located on the inner side of the container.

It is particularly desirable that the self-standing foot has an inverted V-shaped cross section whose diameter gradually increases from a base portion (root portion) of the container toward a ground-contacting edge. Also, it is preferable that an angle of the lower peripheral wall of the body portion with respect to a horizontal plane and an angle of the outer-side wall portion of the bottom wall with respect to the horizontal plane are equal and in mutually opposite directions before inverting and folding back of the bottom wall.

Further, the container of the present invention has a mouth and neck portion standing upright from a body portion with a bottomed cylindrical shape via a shoulder portion, and the body portion is formed in a cylindrical shape or elliptically cylindrical shape.

As a discharging device such as a pump applicable to the container according to the present invention, employed may be a discharging device having a known mechanism in which the mouth and neck portion is attached in a state where a sucking pipe is installed vertically in the container, and contained liquid sucked with the sucking pipe is discharged from a nozzle portion of the discharging device. Therefore, it is possible to employ both a discharging device in which the liquid in the container is discharged from the nozzle portion as it is, and a discharging device in which the liquid in the container is discharged from the nozzle portion in a form of foam using a known mechanism.

The present invention may be manufactured firstly in a manner that a wall surface for pressure-contacting, which extends annularly around the body portion and faces downward, is provided at the lower region of the body portion, and a wall for forming the raised bottom is provided so as to extend from a lower edge of the outer-side wall portion extending downward from the lower edge of the body portion. Then, by inverting the outer-side wall portion upward, the outer-side wall portion or a corner region of the outer-side wall portion formed by the outer-side wall and the wall for forming the raised bottom is brought into pressure contact with the wall surface for pressure-contacting, and the wall for forming the raised bottom is elevated to form the raised bottom. With the configuration above, the wall for forming the raised bottom, which is to be a raised bottom, is moved upward while keeping its state as it is, and the raised bottom has a tapered shape in which at least the peripheral edge slopes toward the inside, and hence, the liquid gathers at the central region when the amount of the remaining liquid is low. Therefore, by opening the lower end of the sucking pipe to the center region of the raised bottom, the liquid in the container can be suck up completely.

The wall for pressure-contacting is formed with a part of the wall of the body portion. The outer-side wall portion or a corner region of the outer-side wall portion formed by the outer-side wall and the wall for forming the raised bottom is brought into pressure contact with the wall surface for pressure-contacting, functioning to close the peripheral edge of the raised bottom formed by inverting the outer-side wall portion upward. The wall for pressure-contacting may be formed in various shapes, provided that the above-described function is possible, and be formed in a horizontal plane facing downward or in an inclined plane.

As for a mechanism of inverting the outer-side wall portion, it is only necessary to adjust the wall thickness of the outer-side wall portion to the extent that the inverting is possible, and, for example, by forming the wall thickness thinner than that of the body portion or the wall for forming the raised bottom, it is possible to easily invert the outer-side wall portion. Note that the wall thickness of the body portion or the wall for forming the raised bottom refers to a thickness of a general synthetic resin bottle. Additionally, it may be possible to form the corner region of the outer-side wall portion formed by the outer-side wall and the wall for forming the raised bottom in an arcuately curved surface to make the inverting easy.

It is preferable that the wall for forming the raised bottom, which becomes the raised bottom after the outer-side wall portion is inverted, is formed to have a thickness with which the wall for forming the raised bottom does not deform by a force acting at the time of inverting the outer-side wall portion. The thickness sizes of the outer-side wall portion and the wall for forming the raised bottom may be set to be either equal or different, provided that the thicknesses are selected as appropriate in a manner that the outer-side wall portion and the wall for forming the raised bottom can achieve the functions described above. If requirements are met, it is not necessary to employ the thickness of the outer-side wall portion as described in the previous paragraph.

A thin hinge may be formed at a boundary between the upper edge of the outer-side wall portion and the body portion.

Therefore, the present invention relates to a container that has a mouth and neck portion standing upright from a body portion with a bottomed cylindrical shape via a shoulder portion, and sucks the liquid in the container by the sucking pipe of the discharging device attached to the mouth and neck portion to discharge the content from the nozzle portion of the discharging device, wherein the body portion has a cylindrical or elliptically cylindrical shape; an annular wall surface for pressure-contacting, which faces downward, is provided at the lower portion of the body portion; a cylindrical outer-side wall portion is provided so as to extend downward from a lower edge of the body portion; a wall for forming the raised bottom formed in a tapered shape that at least a peripheral edge portion of the body portion slopes inward is provided so as to extend from a lower edge of the outer-side wall portion; the outer-side wall portion is formed so as to be able to be inverted upward with the lower edge of the body portion being a center; the outer-side wall portion is inverted upward by pushing up the wall for forming the raised bottom; the outer-side wall portion or a corner region of the outer-side wall portion formed by the wall for forming the raised bottom and the outer-side wall is brought into pressure contact with the wall surface for pressure-contacting; and, the wall for forming the raised bottom is elevated to form the raised bottom.

It may be possible that the wall surface for pressure-contacting constitutes an undersurface of an annular slanting wall provided at a lower portion of the body portion in a manner that the annular slanting wall slants downward toward the outside, and the body portion has, below the annular slanting wall, a large-diameter portion having a large diameter; the outer-side wall portion has the same cylindrical shape as a lower end of the body portion vertically installed at a position lower than a lower edge of the body portion; and, the corner region of the outer-side wall portion formed by the wall for forming the raised bottom and the outer-side wall portion is brought into pressure contact with the wall surface for pressure-contacting by inverting the outer-side wall portion upward.

It may be possible that the wall surface for pressure-contacting constitutes an undersurface of a recessed wall portion provided at a lower portion of the body portion and inwardly recessed; the outer-side wall portion has the same cylindrical shape as a lower end of the body portion vertically installed at a position lower than a lower edge of the body portion; and, the corner region of the outer-side wall portion formed by the wall for forming the raised bottom and the outer-side wall portion is brought into pressure contact with the wall surface for pressure-contacting by inverting the outer-side wall portion upward.

The corner region of the outer-side wall portion formed by the wall for forming the raised bottom and the outer-side wall portion may be formed in an arcuately curved surface.

It may be possible that the wall surface for pressure-contacting constitutes an undersurface of a skirt wall slanting downward toward the outside from a lower end of the body portion; the outer-side wall portion is formed in an inverted-skirt shape that slopes downward toward the inside as opposed to the skirt wall and extends from a lower edge of the skirt wall; and, the outer-side wall portion is brought into pressure contact with the wall surface for pressure-contacting by inverting the outer-side wall portion upward.

The outer-side wall portion may have a wall thickness thinner than those of the body portion and the wall for forming the raised bottom.

A container that stands upright from a cylindrical body portion having a bottom via a shoulder portion to a mouth and neck portion, and sucks the liquid in the container by the sucking pipe of the discharging device attached to the mouth and neck portion to discharge the content from the nozzle portion of the discharging device may be characterized in that: the body portion has a cylindrical or elliptically cylindrical shape; an outer-side wall portion having the same cylindrical shape as the body portion is provided so as to extend downward from a lower edge of the body portion; a wall for forming the raised bottom formed in a tapered shape that at least a peripheral edge portion thereof slopes inward is provided so as to extend from a lower edge of the outer-side wall portion; the outer-side wall portion is formed so as to be able to be inverted upward with the lower edge of the body portion being a center; the outer-side wall portion is inverted upward by pushing up the wall for forming the raised bottom; an outer surface of the outer-side wall portion is brought into contact with a lower end of an inner surface of the body portion to form the raised bottom and, the wall for forming the raised bottom is elevated to form the raised bottom.

The outer-side wall portion after inverted and the lower end of the body portion may be fixed by melting.

According to the present invention, the lower end of the body portion may be formed in a cylindrical or elliptically cylindrical or polygon-cylinder-like shape. Therefore, the upper portion of the body portion may be formed in a shape different from the shape at the lower end thereof, or the entire body portion may be formed in the same cylindrical shape. In this specification, the polygon-cylinder-like shape includes a three-square-cylinder-like body, or five or more-square-cylinder-like body, in addition to the four-square-cylinder-like body illustrated in the drawing as an example. Further, in this specification, the polygon-cylinder-like shape includes a shape in which each corner region is formed in an arcuately curved shape, in other words, so-called corner regions are formed in a curved surface. Yet further, the lower end of the body portion includes a raised bottom that slants downward by way of the outer-side wall portion.

According to the container of the present invention, the outer-side wall portion having a cylindrical shape may include an upper edge continuing to a lower edge of the body portion, and a lower edge having the same plan-view shape as the lower edge of the body portion and slanting downward from one end of the lower edge of the body portion toward the opposing end, and a slanting wall portion extending from the lower edge of the outer-side wall portion may be formed in a slanting-plate-like shape. With this configuration, a slanting raised bottom is formed at the lower portion of the body portion at the time of inverting the outer-side wall portion and the slanting wall portion upward. The slanting wall portion is oriented in any direction in a case where the body portion has a cylindrical or regular-polygon-cylinder-like shape, and is oriented in a direction along the major axis or minor axis in a case where the body portion has an elliptically cylindrical shape.

Then, in the container formed as described above, by pushing the slanting wall portion upward to invert the outer-side wall portion upward, the outer surface of the outer-side wall portion is brought into contact with the lower end portion of the inner surface of the body portion, and the slanting wall portion pivots upward, thereby forming the raised bottom. Therefore, the liquid gathers at the lower portion of the raised bottom when the remaining liquid is low. For this reason, the discharging device used is required to have such characters as described below.

As for a mechanism of inverting the outer-side wall portion, it is only necessary to adjust the wall thickness of the outer-side wall portion to the extent that the inverting is possible, and, for example, by forming the wall thickness of the outer-side wall portion thinner than that of the body portion or the slanting wall portion, it is possible to easily invert the outer-side wall portion. Note that the wall thickness of the body portion or the slanting wall portion refers to a thickness of a general synthetic resin bottle. Further, if the outer-side wall portion is formed in an extremely thin thickness, there may arise a problem in terms of the strength of the outer-side wall portion after the inverting such as the strength resist to pressure and the like at the time when the liquid is injected into the container. In the present invention, the inverted raised bottom inclines and has an area slightly larger than the cross section of the body portion. Therefore, sufficient strength can be obtained even if the outer-side wall portion is formed in a relatively thinner shape, due to an operation that supports the pressure from the upward at the contacting edge between the peripheral edge of the raised bottom and the inner surface of the body portion. Further, the wall thickness is set while considering that the slanting wall portion needs to be forcibly pushed upward at the time of the inverting. Yet further, the inverting becomes easy by forming the corner regions in a thinner wall as compared with the other portions in a case where the body portion has a polygon-cylinder-like shape.

If the requirements described above are met, the thicknesses of the outer-side wall portion and the slanting wall portion may be set to be either equal or different, provided that the thicknesses are appropriately selected such that the outer-side wall portion and the slanting wall portion can achieve the functions described above.

The sucking pipe of the discharging device is bent at the middle portion thereof, and has a predetermined length, so that the lower end of the sucking pipe is open at an edge portion of the bottom portion of the container, and is open at the lowest position of the edge portion of the bottom portion at the time of attaching the container to the discharging device.

Therefore, the present invention relates to a container that stands upright from a cylindrical body portion having a bottom via a shoulder portion to a mouth and neck portion, and sucks the liquid in the container by the sucking pipe of the discharging device attached to the mouth and neck portion to discharge the content from the nozzle portion of the discharging device, wherein: an outer-side wall portion is provided so as to extend downward from a lower edge of the body portion, a slanting wall portion having a slanting-plate-like shape is provided so as to close an opening at a lower end of the outer-side wall portion and extend from a lower edge of the outer-side wall portion; the outer-side wall portion having a tubular shape includes an upper edge continuing to a lower edge of the body portion, and a lower edge having the same plan-view shape as that of the lower edge of the body portion and slanting downward from one end of the lower edge of the body portion toward the opposing end; the outer-side wall portion is formed so as to be able to be inverted upward with the lower edge of the body portion being a center; the outer-side wall portion is inverted upward by pushing up the slanting wall portion; an outer surface of the outer-side wall portion is brought into contact with a lower end of an inner surface of the body portion; and, the slanting wall portion pivots upward with the one end of the lower edge of the body portion being a center to form the raised bottom.

The outer-side wall portion may have a wall thickness thinner than those of the slanting wall portion and the body portion.

A discharging device including a sucking pipe formed in a bent shape, and attached and fixed by screwing a base cap to an outer periphery of the mouth and neck portion is provided with positioning means between the mouth and neck portion and the base cap, for positioning, at the lowest position of the raised bottom, an opening provided at a lower end of the bent sucking pipe at the time of screwing the base cap to the mouth and neck portion.

The present invention may be configured such that, by inverting the outer-side wall portion upward, the outer surface of the outer-side wall portion is brought into contact with the lower end portion of the inner surface of the body portion, and the wall for forming the raised bottom is elevated to form the raised bottom. With this configuration, the wall for forming the raised bottom, which is to be the raised bottom, is moved upward while keeping its state as it is. Further, since the raised bottom is formed in a tapered shape that at least a peripheral edge portion thereof slopes inward, the liquid gathers at the central portion when the remaining liquid is low. Therefore, by positioning the opening provided at the lower end of the sucking pipe at the central portion of the raised bottom, it is possible to completely suck the liquid in the container.

By forming the wall thickness of each corner region thinner than those of the other portions to the degree that can be inverted, it is possible to smoothly perform the inverting and secure the sufficient strength at the outer-side wall portion after the inverting. At this time, the specific thickness may be selected as appropriate depending on the sizes of the container and the like. Further, it may be possible to form the corner region in the arcuately curved shape to facilitate the occurrence of the elastic deformation and make the inverting further easy.

Further, by forming a thin hinge at upper and lower edges of the outer-side wall portion, it is possible to form a sharp corner region, and make the inverting easy. However, this hinge may be omitted, if the inverting is possible without the hinge.

Therefore, the present invention relates to a container that stands upright from a cylindrical body portion having a bottom via a shoulder portion to a mouth and neck portion, and sucks the liquid in the container by the sucking pipe of the discharging device attached to the mouth and neck portion to discharge the liquid from the nozzle portion of the discharging device, wherein: at least a lower end of the body portion has a polygon-cylinder-like shape; an outer-side wall portion having the same cylinder-like shape as the lower end of the body portion is provided so as to extend downward from a lower edge of the body portion; a wall for forming the raised bottom formed in a tapered shape that at least a peripheral edge portion thereof slopes inward is provided so as to extend from a lower edge of the outer-side wall portion; the outer-side wall portion is formed so as to be able to be inverted upward with the lower edge of the body portion being a center; by inverting the outer-side wall portion upward, an outer surface of the outer-side wall portion is brought into contact with a lower end of an inner surface of the body portion; and, the wall for forming the raised bottom to form the raised bottom.

Each corner region of the outer-side wall portion may have a wall thickness thinner than the other portion thereof.

Each corner region of the outer-side wall portion may be formed in an arcuately curved shape.

Upper and lower edge portions of the outer-side wall portion may be connected via a thin hinge with a lower edge of the body portion and a peripheral edge of the wall for forming the raised bottom, respectively.

Effect of the Invention

At the boundary disposed between the body portion and the bottom wall and serving as a starting point for inverting and folding back the bottom wall, there is annularly provided the bending groove having the annular hollow portion therein and protruding outward after inverting and folding back the bottom wall. Therefore, variations in wall thickness do not occur at the boundary because the wall thicknesses of the body portion and the bottom portion need not be changed for the purpose of making the inverting and folding back possible, and the hollow portion improves the cushioning property of the container, whereby it is possible to increase the buckling strength of the container and prevent the deformation of the shoulder portion of the container.

By providing a narrowed portion formed around the entire circumference of a lower peripheral wall of the body portion so as to protrude in the inner direction of the body portion, and, providing an annular rib that protrudes toward the inside and is brought into contact with the inner peripheral wall of the narrowed portion to form a seal portion between the narrowed portion and the annular rib after inverting and folding back the bottom wall, the self-standing foot portion becomes a double structure, whereby it is possible to increase the strength of this portion even if the entire container is formed in a thin thickness. Further, the seal portion formed by the annular rib prevents the content from entering the space formed between the lower peripheral wall of the body portion and the outer-side wall portion of the bottom wall, whereby the appearance of the container does not deteriorate.

The hollow portion has a diameter larger than that of the body portion, and hence, the self-standing position of the container can be stabilized.

The bottom wall is configured by the slanting wall having the highest point at the edge portion thereof and having the liquid pool at the central portion thereof, and plural ribs are formed on the bottom wall so as to be directed toward the liquid pool, whereby it is possible to discharge almost all of the content in the container without the need of bending the sucking pipe of the discharging device (It is possible to employ a straight pipe), which improves the usability. By forming the ribs with the protruding shape on the undersurface that is positioned on the outer side of the container, and with the recessed shape on the top surface that is positioned on the inner side of the container, it is possible to efficiently flow the content into the liquid pool, and to increase the strength of the bottom wall, whereby the bottom wall can be prevented from deforming due to the weight of the content.

The self-standing foot is configured by the annular peripheral wall having the truncated-cone-like shape that gradually increases its diameter from the base portion (root portion) of the container toward the ground-contacting end, and is formed in an inverted V-shape in its cross section, whereby the cushioning property can be improved. This alleviates the force acting from above (force acting at the time of depressing the pressing head), and as a result, the deformation at the shoulder portion of the container can be suppressed.

The angle of the lower peripheral wall of the body portion with respect to a horizontal plane and the angle of the outer-side wall portion of the bottom wall with respect to the horizontal plane are set at an equal angle and in inverted orientation before the inverting and folding back of the bottom wall to form a gentle slope, whereby the bottom wall can be easily inverted and folded back. Further, it is possible to form the self-standing foot in which the lower peripheral wall of the body portion and the outer-side wall portion of the bottom wall are reliably brought into close contact with each other.

The wall for forming the raised bottom formed in a tapered shape that at least a peripheral edge portion thereof slopes inward is provided so as to extend from the lower edge of the outer-side wall portion; by inverting the outer-side wall portion upward, the outer-side wall portion or the corner region formed by the wall for forming the raised bottom and the outer-side wall portion is brought into pressure contact with the wall surface for pressure-contacting formed at the lower portion of the body portion; and, the wall for forming the raised bottom is elevated to form the raised bottom, whereby it is possible to prevent the liquid from remaining on the raised bottom as much as possible. Further, it is possible to avoid the inconvenience that the central portion of the bottom portion has to be raised for the structural reason, even if the container is formed by the blow molding or the like. Therefore, molding such as the blow molding can be employed, and it is possible to achieve excellent productivity and manufacture the container at low cost. Further, it is possible to sufficiently achieve the seal at the peripheral edge of the raised bottom.

The wall surface for pressure-contacting constitutes the undersurface of the annular slanting wall provided at the lower portion of the body portion and slanting downward toward the outside, and the body portion has, below the annular slanting wall, a large-diameter portion having a large diameter; the outer-side wall portion has the same cylindrical shape as that of the lower end of the body portion vertically provided so as to extend downward from the lower edge of the body portion; and, the corner region of the outer-side wall portion formed by the wall for forming the raised bottom and the outer-side wall portion is brought into pressure contact with the wall surface for pressure-contacting by inverting the outer-side wall portion upward. In this case, the wall surface for pressure-contacting has a wider width in the vertical direction. Therefore, even if there exists dimension errors, molding errors and the like at the outer-side wall portion, it is possible to bring the corner region of the outer-side wall portion into pressure contact with the wall for pressure-contacting in a more reliable manner. Further, the lower portion has the large-diameter body portion, and hence, the stability further increases at the time of standing the container A.

The wall surface for pressure-contacting constitutes the undersurface of the recessed wall portion provided at the lower portion of the body portion and recessed toward the inside; the outer-side wall portion has the same cylindrical shape as that of the lower end of the body portion vertically provided so as to extend downward from the lower edge of the body portion; and, the corner region of the outer-side wall portion formed by the wall for forming the raised bottom and the outer-side wall portion is brought into pressure contact with the wall surface for pressure-contacting by inverting the outer-side wall portion upward. In this case, there is an advantage in that the body portion can be formed without forming the protruded portions from the upper end to the lower end.

In the case where the corner region of the outer-side wall portion formed by the outer-side wall portion and the wall for forming the raised bottom is formed in a arcuately curved surface, the seal between the wall surface for pressure-contacting and the corner region of the outer-surface wall portion further improves. As a result, it is possible to reliably prevent the inconvenience such as entry of the liquid into the space between the outer-side wall portion and the opposing body portion.

The wall surface for pressure-contacting constitutes an undersurface of a skirt wall sloping downward toward the outside from the lower end of the body portion; the outer-side wall portion is formed in an inverted-skirt shape so as to slope downward toward the inside as opposed to the skirt wall and extend from the lower edge of the skirt wall; and, the outer-side wall portion is brought into pressure contact with the wall surface for pressure-contacting by inverting the outer-side wall portion upward. In this case, the lower end of the body portion has a large diameter, and hence, the stability further increases at the time of standing the container. Further, it is easy to invert the inverted-skirt-shaped outer-side wall portion.

In the case where the outer-side wall portion has a wall thickness thinner than those of the body portion and the wall for forming the raised bottom, inverting of the outer-side wall portion is easy, and it is possible to prevent the inconvenience such as deformation of the wall for forming the raised bottom at the time of inverting.

The container that stands upright from the cylindrical body portion having the bottom via the shoulder portion to the mouth and neck portion, and sucks the liquid in the container by the sucking pipe of the discharging device attached to the mouth and neck portion to discharge the liquid from the nozzle portion of the discharging device is characterized in that: the body portion has a cylindrical or elliptically cylindrical shape; the outer-side wall portion having the same cylindrical shape as the body portion is provided so as to extend downward from the lower edge of the body portion; the wall for forming the raised bottom formed in a tapered shape that at least the peripheral edge portion thereof slopes inward is provided so as to extend from the lower edge of the outer-side wall portion; the outer-side wall portion is formed so as to be able to be inverted upward with the lower edge of the body portion being a center; the outer-side wall portion is inverted upward by pushing up the wall for forming the raised bottom; the outer surface of the outer-side wall portion is brought into contact with the lower end of the inner surface of the body portion; and the wall for forming the raised bottom is elevated to form the raised bottom. In this case, it is possible to prevent the liquid from remaining on the raised bottom as much as possible, and to avoid the inconvenience that the central portion of the bottom portion has to be raised for the structural reason, even if the container is formed by the blowing molding and the like. Therefore, molding such as the blow molding can be employed, and it is possible to achieve excellent productivity and manufacture the container at low cost.

In the case where the outer-side wall portion after inverted and the lower end of the body portion are fixed by melting, it is possible to gain the advantage of further reliably achieving the seal at the peripheral edge of the raised bottom.

In the case where the raised bottom is sloped and the opening at the lower end of the sucking pipe is placed at the lowest position of the raised bottom, it is possible to prevent the liquid from remaining on the raised bottom as much as possible and to avoid the inconvenience that the central portion of the bottom portion has to be raised for the structural reason, even if the container is formed by the blow molding or the like. Therefore, molding such as the blow molding can be employed, and it is possible to achieve excellent productivity and manufacture the container at low cost.

In the case where the outer-side wall portion has a wall thickness thinner than the slanting wall portion and the body portion have, it is possible to gain the advantage of easily inverting the outer-side wall portion.

The discharging device having a sucking pipe formed in a bent shape, and fixed and attached by screwing the base cap around the outer periphery of the mount and neck portion is provided, between the mouth and neck portion and the base cap, with the positioning means for positioning, at the lowest position of the raised bottom, the opening provided at the lower end of the bent sucking pipe. In this case, the opening at the lower end of the sucking pipe can be reliably and easily placed at the lowest position of the raised bottom.

The wall for forming the raised bottom formed in a tapered shape that at least the peripheral edge portion slopes toward the inside is provided so as to extend from the lower edge of the outer-side wall portion; the outer-side wall portion is inverted upward to bring the outer surface of the outer-side wall portion into contact with the inner surface of the lower end of the body portion to form the raised bottom; and, the wall for forming the raised bottom is elevated to form the raised bottom. This makes it possible to prevent the liquid from remaining on the raised bottom as much as possible and to avoid the inconvenience that the central portion of the bottom portion has to be raised for the structural reason, even if the container is formed by the blow molding or the like. Therefore, molding such as the blow molding can be employed, and it is possible to achieve excellent productivity and manufacture the container at low cost. Further, in a case where the body portion has the polygon-cylinder-like shape, it is possible to gain an advantage that the container is easily held, and is less slippery when used in wet condition.

In the case where each corner region of the outer-side wall portion has a wall thickness thinner than the other portions thereof have, the outer-side wall portion can be extremely easily inverted. Further, even if the thickness of the outer-side wall portion itself is relatively thick, the outer-side wall portion can be easily inverted. Consequently, in the state where the corner region is brought into contact with the inner surface of the lower end portion of the body portion, the container obtains the sufficient strength as well as the high durability capable of withstanding the hydraulic pressure.

In the case where each corner region of the outer-side wall portion is formed in an arcuately curved shape, it is possible to easily perform the elastic deformation of said portion, and the outer-side wall portion can be further easily inverted. In particular, this effect can be further enhanced by combining with the configuration in which each corner region of the outer-side wall portion has a wall thickness thinner than the other portions thereof have.

In the case where the upper and the lower edge portions of the outer-side wall portion are connected via the thin hinge with the lower edge of the body portion and the peripheral edge of the wall for forming the raised bottom, respectively, the outer-side wall portion can be further easily inverted. Further, the boundary line becomes clear after the outer-side wall portion is inverted, it is possible to bring the peripheral edge of the raised bottom and the inner surface of the body portion into further closely contact with each other.

BEST MODE FOR CARRYING OUT THE INVENTION

Hereinbelow, embodiments according to the present invention will be described in detail with reference to the drawings.

Figure 1:
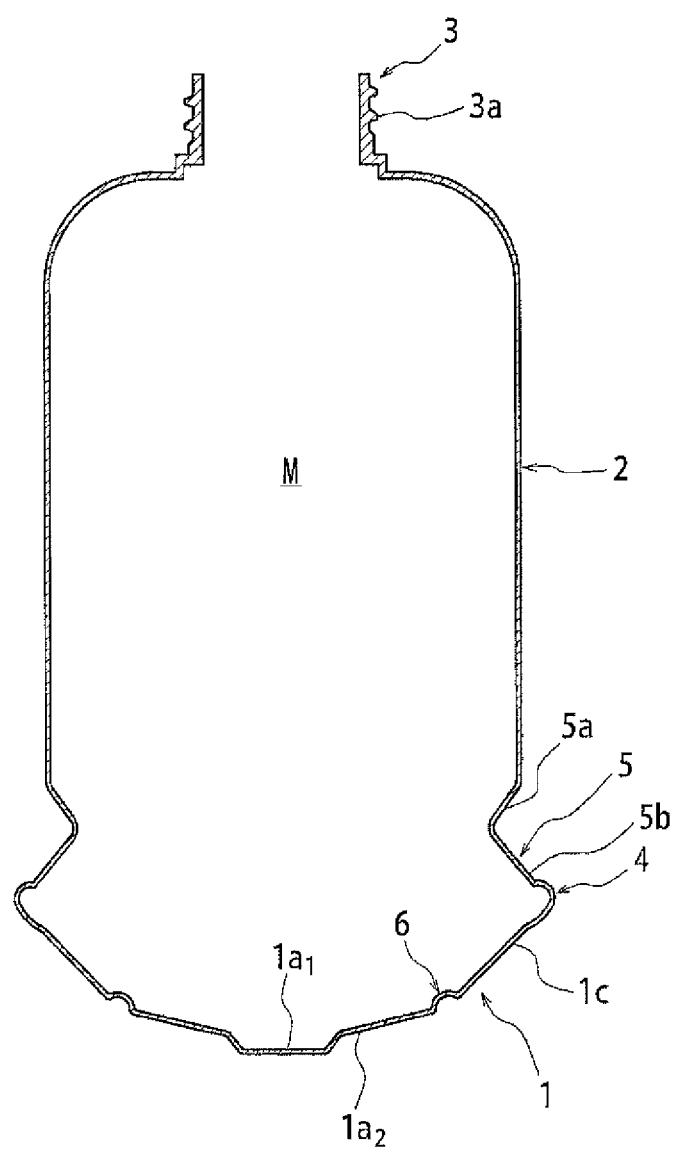
FIG. 1 is a diagram illustrating an embodiment of a synthetic resin container according to the present invention.
Figure 2:
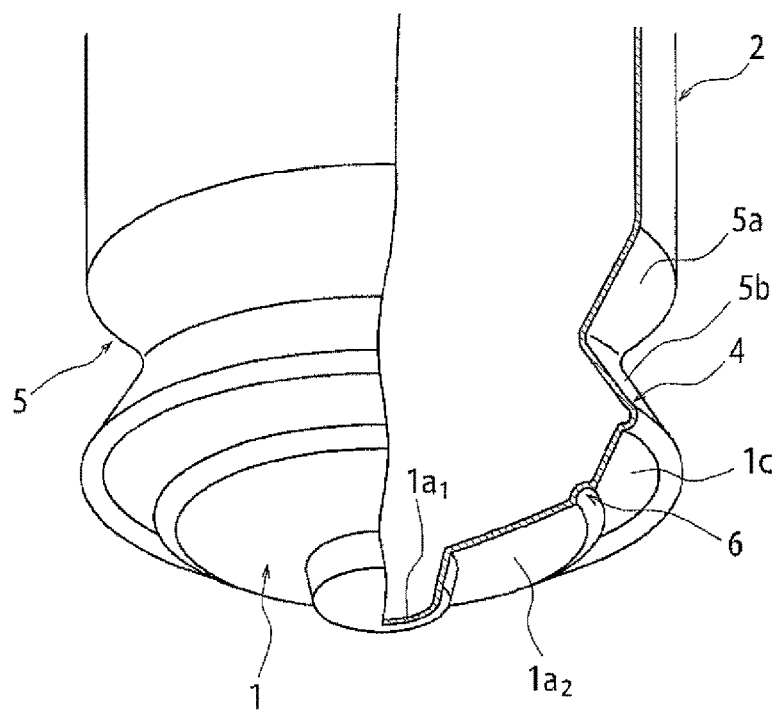
FIG. 2 is a perspective external view illustrating a bottom portion of the synthetic resin container illustrated in FIG. 1.
Figure 3:
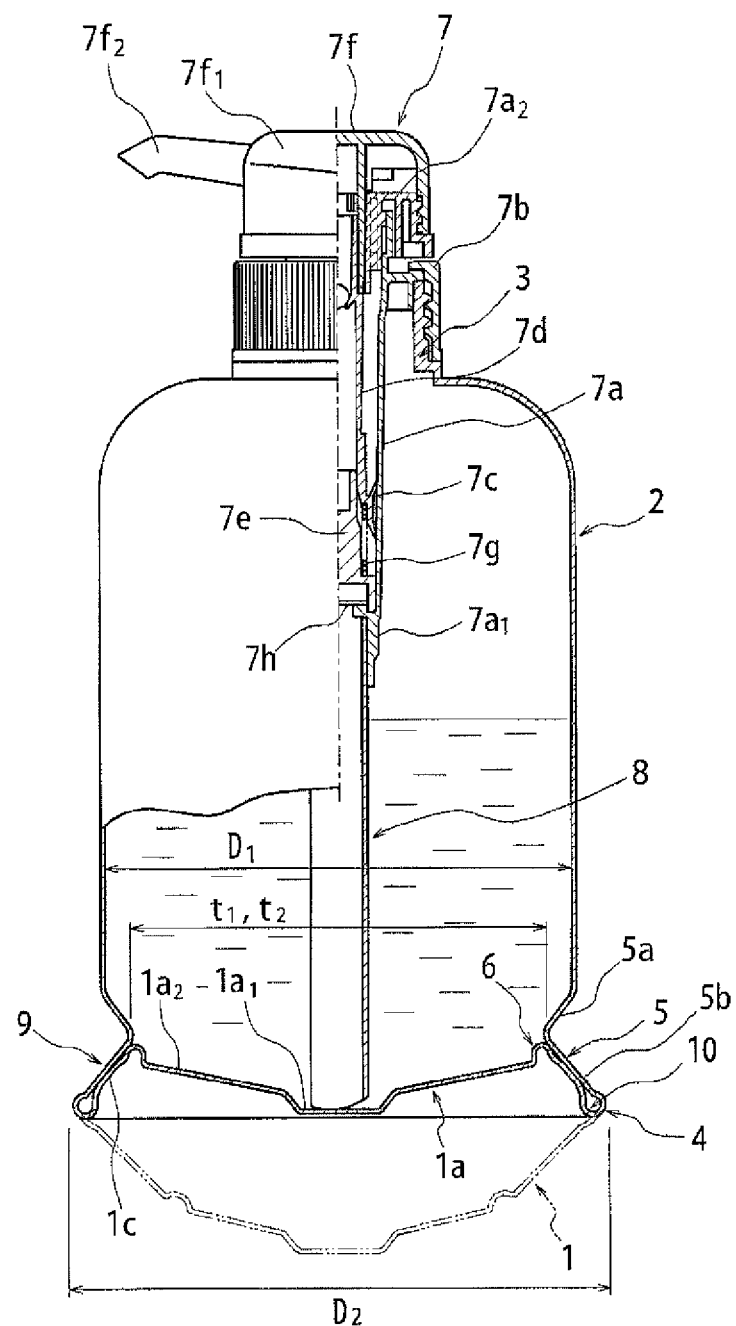
FIG. 3 is a diagram illustrating a use state of the synthetic resin container illustrated in FIG. 1.

FIG. 1 is a diagram schematically illustrating a mode of a container having an inverted, folded back bottom portion according to the present invention. FIG. 2 is a perspective view of an appearance of the container illustrated in FIG. 1 before a bottom wall thereof is inverted and folded back. FIG. 3 is a diagram illustrating the container in a state where a raised bottom is formed by inverting and folding back the bottom wall thereof and a discharging device such as a pump is attached. For a container suitable for the present invention, a synthetic resin generally used for manufacturing a container is used, and is formed into a desirable shape by using a blow molding or injection molding.

In FIGS. 1 through 3, reference number 1 represents a bottom wall having a circular, plate-like shape for forming a bottom portion of the container. This bottom wall 1 includes a slanting wall in which an edge portion of the bottom wall 1 is the highest position and the center region is the lowest position after it is inverted and folded back toward the upper and inner side, in other words, toward the inside of a body portion to form a raised bottom 1a. At the center region of the bottom wall 1, there is formed a recessed portion for forming a liquid pool $1a_1$ (see FIG. 3).

Reference number 2 represents a cylindrical body portion standing from an outer periphery of the bottom wall 1, for forming a filling space of the content inside M thereof. The body portion 2 is connected integrally with the bottom wall 1. Reference number 3 represents a mouth and neck portion provided integrally to a top portion of the body portion 2, for forming a passage connected to the filling space M. The mouth and neck portion 3 has a cylindrical shape, and an outer peripheral wall thereof is provided with a threaded portion 3a for attaching the discharging device such as a pump (it may be possible to attach the discharging device by engagement using undercut).

Reference number 4 represents a bending groove provided at a boundary between the bottom wall 1 and the body portion 2. The bending groove 4 is a groove from which the inverting and folding back of the bottom wall 1 starts, and has a cross-sectional shape protruding outward from the container after the bottom wall 1 is inverted and folded back as illustrated in FIG. 3. More specifically, the bending groove 4 has a U-shape or a square U-shape in its cross section.

Reference number 5 represents a "narrowed portion (recessed portion)" provided to the lower peripheral wall of the body portion 2. The narrowed portion 5 includes an upper peripheral wall 5a whose diameter gradually increases toward the upward direction, and a lower peripheral wall 5b connected with a lower end of the upper peripheral wall 5a and whose diameter gradually increases toward the downward direction. Further, the narrowed portion 5 is formed around the entire circumference of the body portion 2, and is formed in a "boomerang" shape in its cross section in a shape that protrudes toward the inner direction of the body portion 2.

Reference number 6 represents an annular rib provided at almost the middle portion of the bottom wall 1 in the radial direction and protruding inwardly (toward the inside of the body portion). The annular rib 6 sections the bottom wall 1 into an inner-side wall portion $1a_2$ and an outer-side wall portion 1c, and serves as a start portion for forming the shape of the bottom wall 1 at the time of inverting and folding back the bottom wall 1. Further, when the bottom wall 1 is inverted and folded back, the annular rib 6 is brought into contact with the inner surface of the lower peripheral wall 5b of the narrowed portion 5 to form a seal portion between them.

Reference number 7 represents a priming-type discharging device attached to the mouth and neck portion 3 of the container. The discharging device 7 includes: a cylinder 7a passing through the mouth and neck portion 3 of the container and hung and supported at an upper portion of the filling space M; a base cap 7b for supporting the cylinder 7a and fixing the cylinder 7a to the mouth and neck portion 3 of the container; a hollow piston 7c disposed in the cylinder 7a so as to be able to reciprocatingly move; a hollow stem 7d connected integrally with the upper portion of the piston 7c and having a check valve in an inner-side passage of the piston 7c; a poppet (valve) 7e disposed on the inner side of the cylinder 7a; a pressing head 7f (including an operation portion $7f_1$ and discharging nozzle $7f_2$) having a cylindrical body connected with the upper portion of the hollow stem 7d and driving the piston 7c through the hollow stem 7d; a spring 7g disposed in the cylinder 7a and upwardly pressing (resiliently supporting) the pressing head 7f together with the piston 7c and the hollow stem 7d; and, a valve body (three-port valve and the like) 7h disposed at a sucking port $7a_1$ at the lower end of the cylinder 7a, and releasing the content only at the time of sucking. Further, a base portion $7a_2$ is fitted to the upper end portion of the cylinder, and the pressing head is screwed to the base portion.

Further, reference number 8 represents a sucking pipe connected with the sucking port $7a_1$ of the cylinder 7a. The sucking pipe 8 has a straight shape, and the lower end thereof is located at the liquid pool $1a_1$ provided at the center region of the bottom wall 1. A gap is formed between the bottom wall 1 and the lower end of the sucking pipe 8 so as to reliably suck the content.

The synthetic resin container according to the present invention has a shape as illustrated in FIG. 1 immediately after the molding. Then, by pressing a wall for forming the raised bottom (formed by the liquid pool $1a_1$ and the inner-side wall portion $1a_2$) toward the filling space M of the content, the portion for forming the raised bottom is inverted and folded back with the bending groove 4 for forming a boundary with the body portion 2 being the start point as illustrated in FIG. 3 to form the raised bottom 1a. As a result, the lower peripheral wall of the body portion 2 (corresponding to the lower outer surface 5b of the narrowed portion 5) and the outer-side wall portion 1c of the bottom wall 1 are brought into contact with each other or placed in proximity to each other, whereby a self-standing foot 9 having a truncated cone shape is formed at the lower end of the container, and at the same time, an annular hollow portion (hollow ring) 10 is formed at the boundary portion between the bottom wall 1 and the body portion 2.

The annular hollow portion 10 is provided so as to correspond to a ground-contacting portion located at the lowest end of the self-standing foot portion 9, improving a cushioning property of the container and contributing to improvement in buckling strength.

The bending groove 4 may be formed in a U-shape or a square U-shape in its cross section. Although description has been made of an example of the shape of the bending groove 4 in which the annular hollow portion 10 having a circular cross section is formed when the bottom wall 1 is inverted and folded back, the shape of the bending groove 4 is not particularly limited.

As illustrated in FIG. 3, the hollow portion 10 preferably have a diameter D2 (diameter after inverting and folding back) larger than a diameter D1 of the body portion 2, which makes the self-standing position of the container further stable. Further, it is preferable to set the outer diameter t1 of the annular rib 6 provided to the bottom wall 1 to be a size almost equal to the inner diameter t2 of a portion of the narrowed portion 5 located at the smallest diameter. This makes it possible to reliably seal between the lower peripheral wall of the body portion 2 (lower peripheral wall 5b of the narrowed portion 5) and the outer-side wall portion 1c to prevent the content from entering.

In particular, at the time of forming the container with a thin wall, there is a concern that the shape of the bottom wall 1 deforms due to the weight of the content, and a space is formed between the lower peripheral wall of the body portion 2 (lower peripheral wall 5b of the narrowed portion 5) and the outer-side wall portion 1c of the bottom wall 1. However, by forming the seal portion by the annular rib 6, it is possible to achieve the reliable seal. Although it has been described that the annular rib 6 has a U-shape in its cross section, it may be possible to change the shape of the annular rib 6, provided that the seal portion is reliably form.

To discharge the content in the container by the discharging device 7, the connection between the operation portion $7f_1$ of the pressing head 7f and the base portion $7a_2$ is release (FIG. 1 illustrates a connection state with screw). Then, the pressing head 7f is pushed upward by the pressing force of the spring 7g.

After the pressing head 7f is pushed upward by the spring 7g, the piston 7c and the hollow stem 7d are also pushed upward together with the pressing head 7f, which makes the inner side of the cylinder 7a negative pressure. This causes the content in the filling space M to be sucked through the sucking pipe 8 into the cylinder 7a.

In this state, by pressing the pressing head 7f, the inner side of the cylinder 7a is pressurized and compressed; at the time when the pressure in the cylinder reaches a predetermined pressure, the pressurized and compressed content passes through a space formed between the piston 7c and the poppet 7e and the inner passage in the hollow stem 7d, and is discharged toward the external space from the nozzle portion $7f_2$ of the pressing head 7f. By repeating the pressing of the pressing head 7f and the recovery by the spring 7g several times, it is possible to continuously discharge the content.

The synthetic resin container according to the present invention has the liquid pool $1a_1$ at the center region of the bottom wall 1, and hence, the content flows toward the center region of the bottom wall 1 regardless of the filling amount of the content. Therefore, it is possible to discharge almost all of the content in the container by the discharging device 7, achieving excellent usability.

Figure 4:
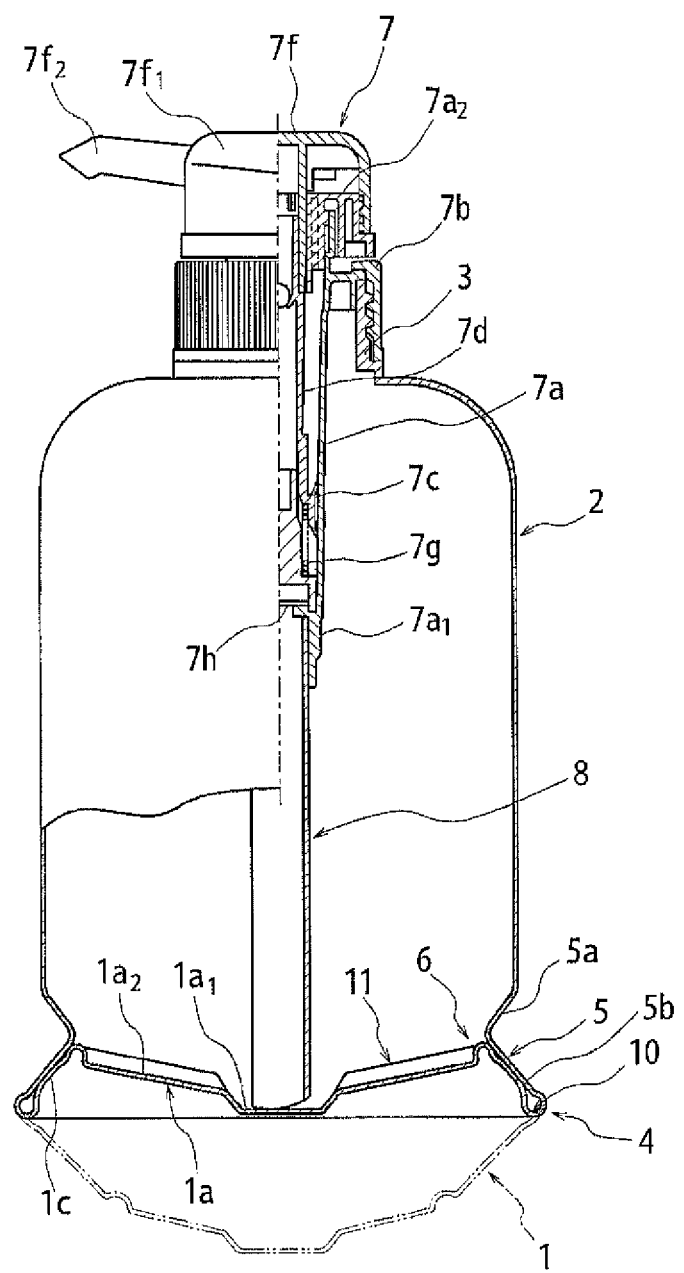
FIG. 4 is a diagram illustrating a use state of another embodiment of the synthetic resin container according to the present invention.
Figure 5:
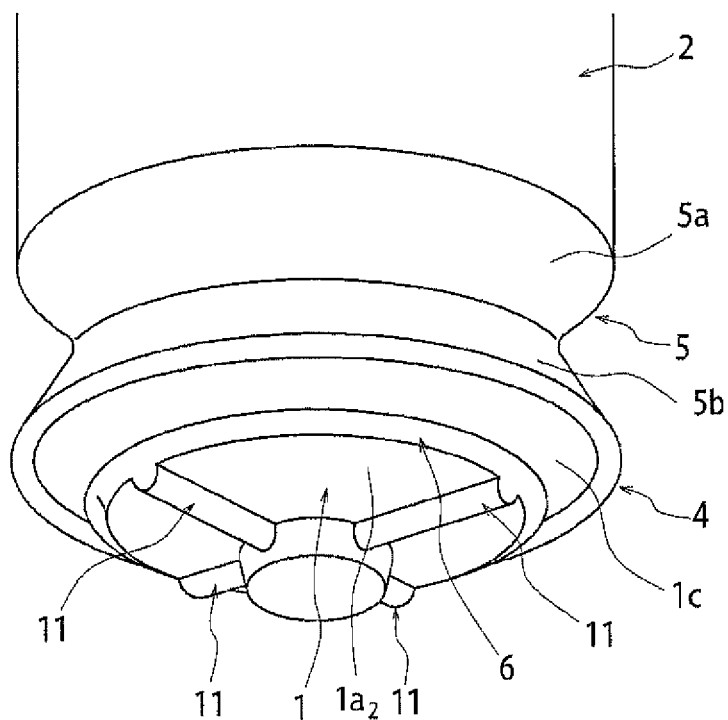
FIG. 5 is a perspective external view illustrating a bottom portion of the synthetic resin container illustrated in FIG. 4.

FIG. 4 and FIG. 5 are diagrams illustrating another embodiment of the synthetic resin container according to the present invention. The drawings illustrate an example of the synthetic resin container having four ribs 11 disposed on a bottom wall 1 in a direction from the edge portion of the bottom wall 1 toward a liquid pool $1a_1$ at intervals of 90°. Each of the ribs 11 has a protruding shape on the undersurface of the bottom wall 1, and a recessed shape on the top surface of the bottom wall 1. By disposing the ribs 11 on the bottom wall 4, it is possible to increase the rigidity of the bottom wall 1 and prevent the shape of the bottom wall 1 from deforming by the weight of the content. Further, the recessed portions of the ribs 11 function as groove portions. Therefore, the content in the container efficiently flows into the liquid pool $1a_1$ along the recessed shape, whereby it is possible to efficiently collect the content especially in a case where the remaining amount of the content is low.

In the description above, the discharging device attached to the present invention employs the pressing head that moves vertically. However, it may be possible to employ a trigger-type discharging device and the like, and the type of the discharging device is not particularly limited.

It is preferable that, before the inverting and folding back, angles (inclination angles) of the lower peripheral wall of a body portion 2 (corresponding to a lower peripheral wall 5b of a narrowed portion 5) and a outer-side wall portion 1c of the bottom wall 1 with respect to a horizontal plane are set in an angle that forms a gentle angle. This makes it easy to invert and fold back the bottom wall 1. Further, by setting an angle of the lower peripheral wall 5b of the narrowed portion 5 with respect to the horizontal plane at an equal angle, in inverted orientation, to an angle of the outer-side wall portion 1c of the bottom wall 1 with respect to the horizontal plane, the lower peripheral wall 5b of the narrowed portion 5 can be reliably brought into close contact with the outer-side wall portion 1c of the bottom wall 1 after the inverting and folding back.

Next, with reference to FIG. 6 through FIG. 10, another embodiment of the present invention will be specifically described.

Figure 6:
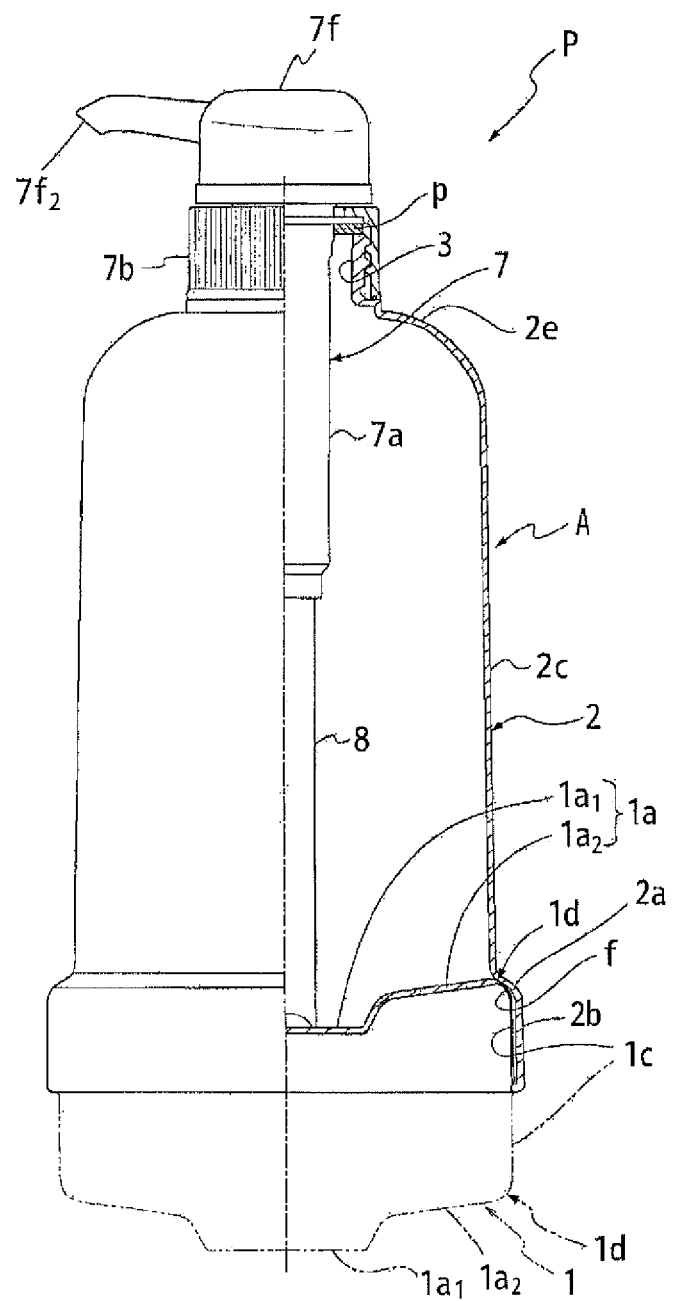
FIG. 6 is a semi-sectional view illustrating a container having a discharging device attached thereto in another embodiment of the synthetic resin container according to the present invention.

FIG. 6 illustrates one example of a pump container P in which a discharging device 7 such as a pump is attached to a container body A. The container body A is formed integrally by the blow molding using synthetic resin, and stands upright from the upper end of a cylindrical body portion 2 via a shoulder portion 2e to a mouth and neck portion 3. The body portion 2 is configured such that an annular slanting wall 2a slanting downward toward the outside is provided at the lower portion of the body portion 2; with respect to a slanting wall 2a, a large-diameter portion 2b is formed below the slanting wall 2a, and a small-diameter portion 2c is formed above the slanting wall 2a; and the undersurface of the annular slanting wall 2a is configured as a wall surface f for pressure-contacting. Further, at the lower end portion of the body portion 2, a raised bottom 1a extends by way of an outer-side wall portion 1c.

Figure 7:
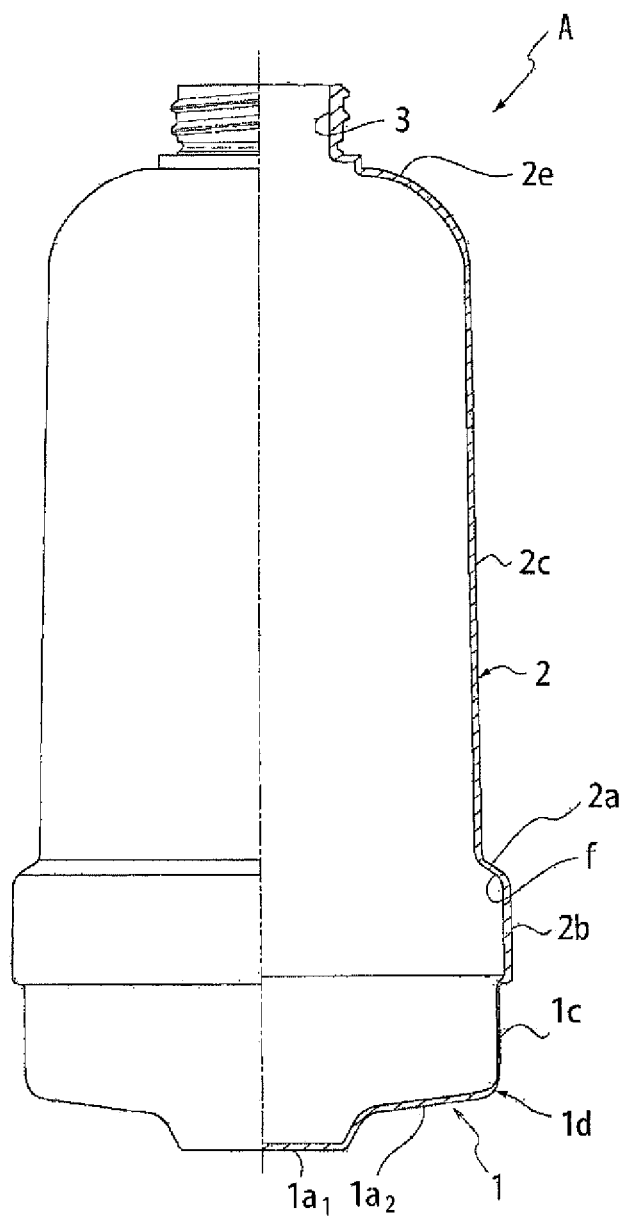
FIG. 7 is a semi-sectional view illustrating the synthetic resin container illustrated in FIG. 6 before the bottom portion of the container is inverted.

First, as illustrated in FIG. 7, the container body A includes a bottom wall 1 for forming the bottom portion of the container, and the body portion 2 connecting integrally with the outer periphery of the bottom wall 1, and the body portion 2 has a filling space for the content in the inner side thereof. More specifically, in FIG. 7, the container body A is configured such that the outer-side wall portion 1c is integrally installed downward from the lower edge of the body portion 2, in other words, from the lower edge of the large-diameter portion 2b, and, the wall for forming the raised bottom (formed by a liquid pool $1a_1$ and an inner-side wall portion $1a_2$) for closing the lower end opening of the outer-side wall portion 1c integrally extends from the lower edge of the outer-side wall portion 1c.

As illustrated in FIG. 7, the outer-side wall portion 1c has the same cylindrical shape as the body portion 2 has, in other words, the outer-side wall portion 1c has a cylindrical shape, and is formed such that the outer surface of the outer-side wall portion 1c has substantially the same diameter as the inner surface of the lower end portion of the body portion 2 has, in other words, as the inner surface of the large-diameter portion 2b has. Further, a corner region 1d of the outer-side wall portion that connects the outer-side wall portion 1c with the wall for forming the raised bottom is formed in an arcuately curved surface, in other words, is formed in a curved surface. Yet further, the outer-side wall portion 1c and the corner region 1d of the outer-side wall portion are formed by a thinner wall as compared with the thickness of the wall for forming the raised bottom and the body portion 2, so as to be able to be easily inverted upward to the outer-side surface portion 1c. And, the outer-side wall portion 1c and the corner region 1d of the outer-side wall portion are configured such that, as illustrated in FIG. 6, when the outer-side wall portion 1c is inverted, the corner region 1d of the outer-side wall portion is also inverted upward, so as to form a curved surface obliquely protruding upward toward the outside.

The wall for forming the raised bottom integrally extends from the lower edge of the outer-side wall portion 1c so as to close the lower end opening of the outer-side wall portion 1c. At the central portion, there is provided the liquid pool $1a_1$ having the circular shape similar to the peripheral edge portion and having a recessed shape; the circumference of the liquid pool $1a_1$ is formed at the inner-side wall portion $1a_2$ descending inward; and, the inner-side wall portion $1a_2$ is connected with the lower edge of the outer-side wall portion 1c so as to close the lower end opening of the outer-side wall portion 1c. When the outer-side wall portion 1c is inverted, the liquid pool $1a_1$ and the inner-side wall portion $1a_2$ are elevated, and the wall for forming the raised bottom becomes the raised bottom 1a.

From the state illustrated in FIG. 7, by pushing the wall for forming the raised bottom upward with respect to the body portion 2, the outer-side wall portion 1c is inverted upward, and, a corner region 1d of the outer-side wall portion that connects the outer-side wall portion 1c with the raised bottom 1a is brought into pressure contact with the wall surface f for pressure-contacting as illustrated in FIG. 6. At this time, the wall for forming the raised bottom is elevated while keeping its state as it is, and forms the raised bottom 1a.

The discharging device 7 is fixed to the container body A by a base cap 7b fitted to the outer periphery of a mouth and neck portion 3; a flange of a cylinder 7a attached on the mouth and neck portion 3 by way of a gasket p is fixed by a flange-like top plate of a base cap 7b; the lower portion of the cylinder 7a is installed vertically in the upper portion of the container body A; and, a pressing head 7f is fitted to the upper end of a stem (not shown) protruding at a position higher than the cylinder 7a in an energized state so as to be able to be pushed. Further, the lower end of a sucking pipe 8, upper end of which is fitted to the lower end portion of the cylinder 7a, is installed vertically in a manner that an opening portion at the lower end of the sucking pipe 8 is disposed in the vicinity of the upper surface of the liquid pool $1a_1$. Note that FIG. 6 illustrates a state where the pressing head 7f is depressed, and a state where the pressing head 7f is screwed to the base portion $7a_2$ fitted to the upper end portion of the cylinder 7a as illustrated in detail in FIG. 3.

In the pump container P having the configuration described above, the screwed state of the pressing head 7f is released from the state illustrated in FIG. 6 to elevate the pressing head 7f, and then, the pressing head 7f is moved vertically from this state, whereby the liquid in the container body A is sucked from the opening at the lower end of the sucking pipe 8 using an operation of a built-in pump mechanism to discharge the liquid from a nozzle portion $7f_2$ of the pressing head 7f.

Figure 8:
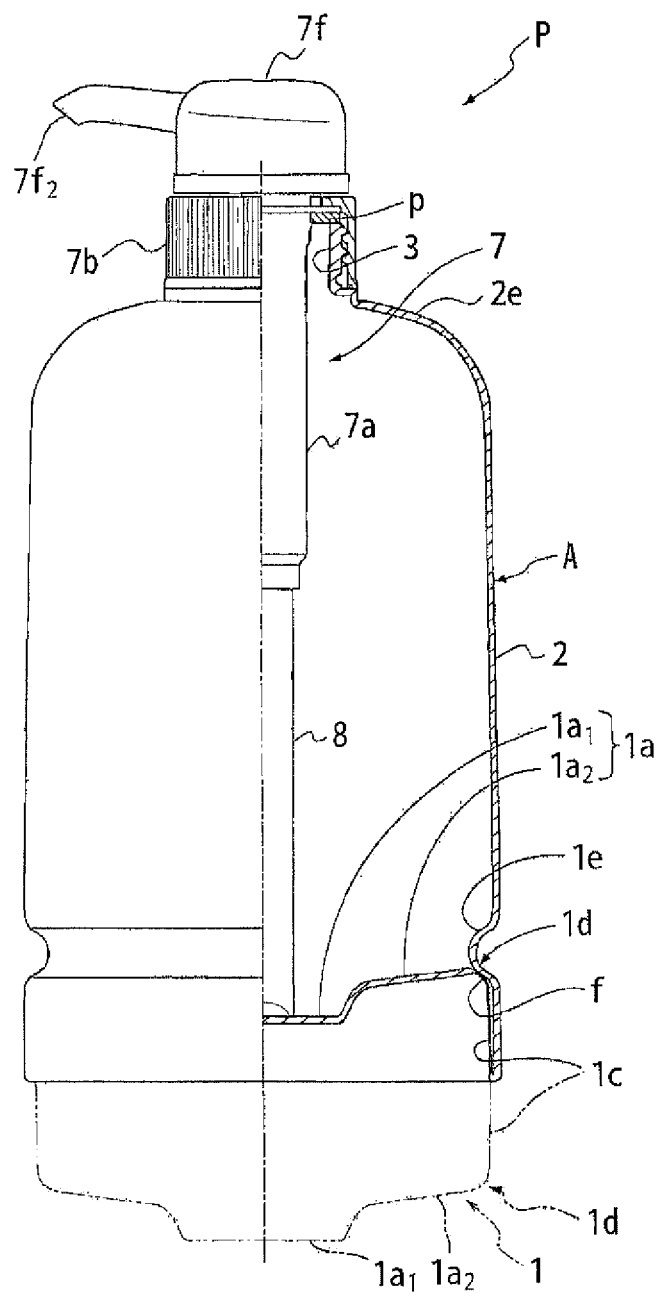
FIG. 8 is a semi-sectional view illustrating a container having a discharging device attached thereto in another embodiment of the synthetic resin container according to the present invention.

FIG. 8 illustrates another example in which the annular slanting wall 2a is formed by the lower half of a recessed wall portion 1e provided at the lower end of the body portion 2 and recessed inward. The recessed wall portion 1e is formed such that a predetermined position at the lower portion of the body portion 2 is recessed toward the inside in a semicircular shape, and the undersurface of the recessed wall portion 1e is configured as a wall surface f for pressure-contacting. Therefore, portions other than the recessed wall portion 1e of the body portion 2 have the same diameter. Since the other configurations are the same as those illustrated in the example in FIG. 6, the same reference characters are attached and explanations thereof are omitted.

In this case, as illustrated in the long dashed double-dotted line in FIG. 8, the bottom portion of the container body A is first formed in a shape that the outer-side wall portion 1c and the wall for forming the raised bottom protrude downward. Then, from this state, by pushing the wall for forming the raised bottom upward with respect to the body portion 2, the outer-side wall portion 1c is inverted upward, and the corner region 1d connecting the outer-side wall portion 1c and the raised bottom 1a is brought into pressure contact with the wall surface f for pressure-contacting. At this time, the wall for forming the raised bottom is elevated while keeping its state as it is to form the raised bottom 1a.

Figure 9:
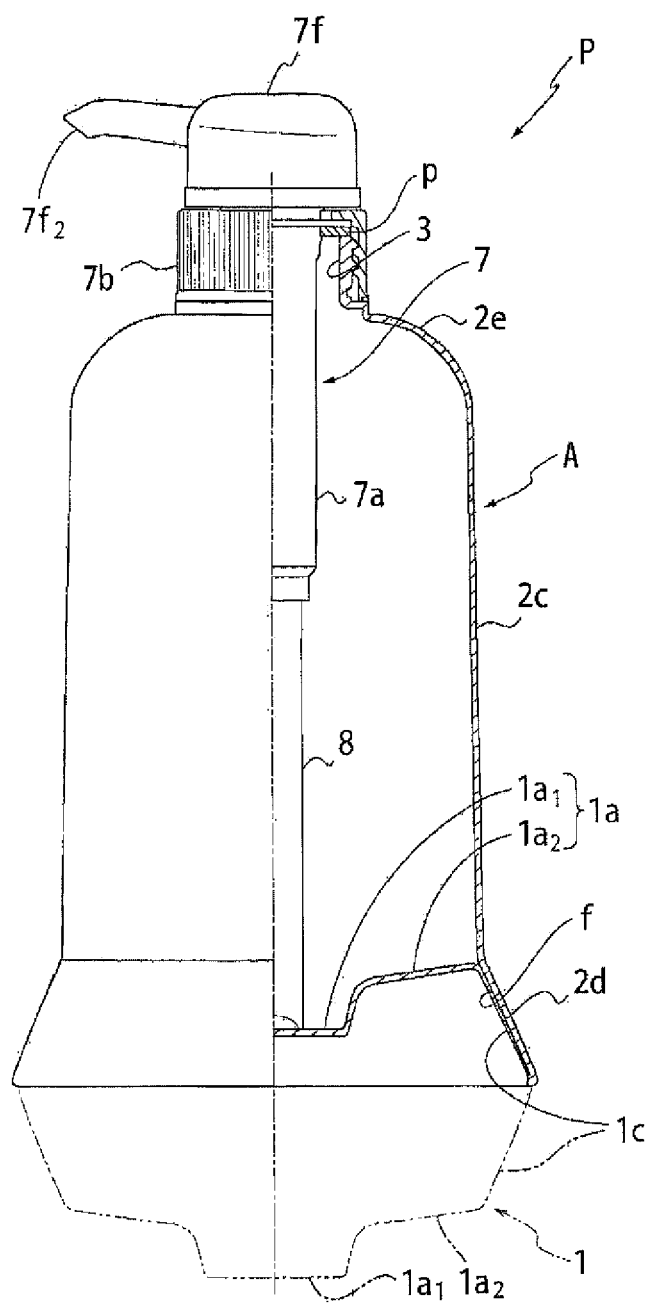
FIG. 9 is a semi-sectional view illustrating a container having a discharging device attached thereto in another embodiment of the synthetic resin container according to the present invention.

FIG. 9 illustrates still another example. In this example, the lower end portion of a body portion 2 is formed at a skirt wall 2d slanting downward toward the outside, and the undersurface of the skirt wall 2d is configured as a wall surface f for pressure-contacting. Further, as illustrated in the long dashed double-dotted line in FIG. 9, an outer-side wall portion 1c having the inverted-skirt shape as opposed to the skirt wall 2d is provided so as to slant downward toward the inside from the lower edge of the skirt wall 2d, and, the wall for forming the raised bottom similar to that illustrated in FIG. 6 extends from the lower edge of the out-side wall portion 1c. Therefore, portions other than the skirt wall 2d of the body portion 2 have the same diameter. Since the other configurations are the same as those illustrated in the example in FIG. 6, the same reference characters are attached and explanations thereof are omitted.

In this case, as illustrated in the long dashed double-dotted line in FIG. 9, the bottom portion of the container body A is first formed in a shape that the outer-side wall portion 1c and the wall for forming the raised bottom protrude downward. Then, from this state, by pushing the wall for forming the raised bottom upward with respect to the body portion 2, the outer-side wall portion 1c is inverted upward, and the outer surface of the outer-side wall portion 1c is brought into pressure contact with the wall surface f for pressure-contacting. At this time, the wall for forming the raised bottom is elevated while keeping its state as it is to form the raised bottom 1a.

Figure 10:
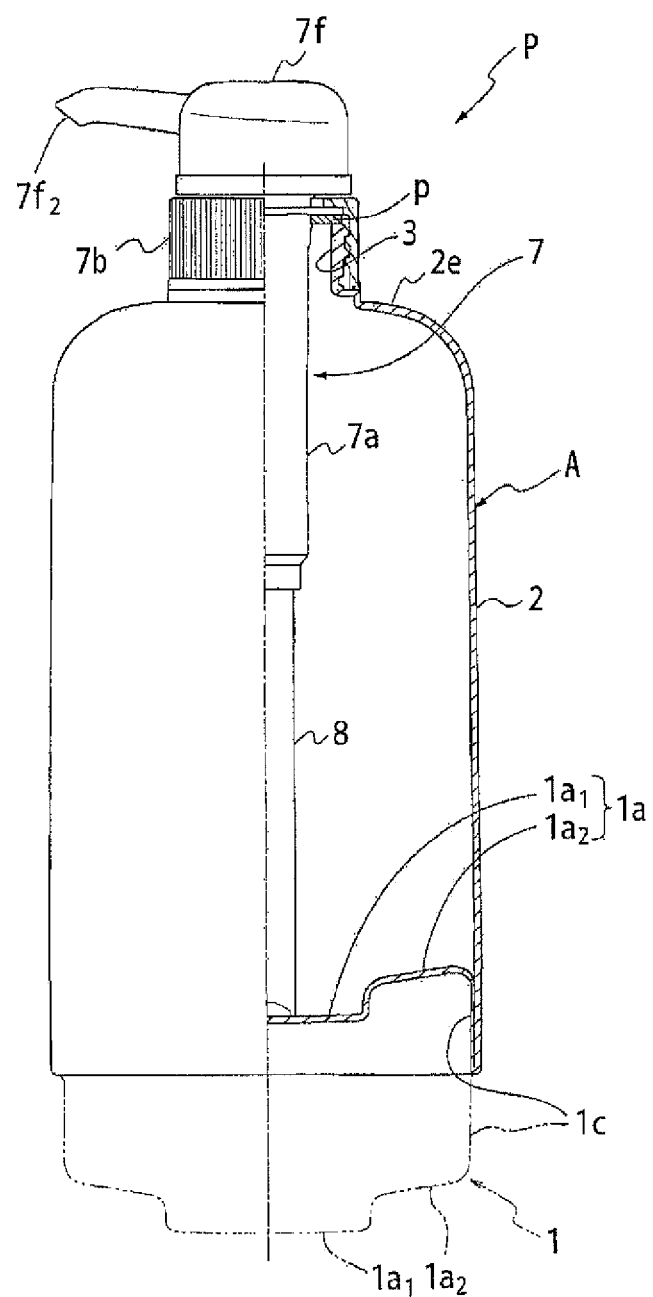
FIG. 10 is a semi-sectional view illustrating a container having a discharging device attached thereto in another embodiment of the synthetic resin container according to the present invention.

FIG. 10 illustrates still another example. In this example, an outer-side wall portion 1c having the same cylindrical shape as a body portion 2 has is provided so as to extend downward from the lower edge of the cylindrical body portion 2, and the wall for forming the raised bottom is provided so as to extend from the lower edge of the outer-side surface portion 1c similar to that illustrated in FIG. 6. The outer-side wall portion 1c has a wall thickness thinner than those of the body portion 2 and the wall for forming the raised bottom, and is formed so as to be able to be inverted upward with the lower edge of the body portion 2 being a center. Further, by inverting the outer-side wall portion 1c upward, the outer surface of the outer-side wall portion 1c is brought into contact with the lower end portion of the inner surface of the body portion 2, and the wall for forming the raised bottom is elevated to form the raised bottom 1a. In this example, after the inverting, the outer-side wall portion 1c and the lower end portion of the body portion 2 are fixed with each other by melting. As a method of fixing, it is possible to employ a known method such as a high-frequency bonding. Since the other configurations are the same as those illustrated in the example in FIG. 6, the same reference characters are attached and explanations thereof are omitted.

In this case, as illustrated in the long dashed double-dotted line in FIG. 10, the bottom portion of the container body A is first formed in a shape that the outer-side wall portion 1c and the wall for forming the raised bottom protrude downward. Then, from this state, by pushing the wall for forming the raised bottom upward with respect to the body portion 2, the outer-side wall portion 1c is inverted, so that the outer surface of the outer-side wall portion 1c and the inner surface of the body portion 2 are brought into contact with each other. At this time, the wall for forming the raised bottom is elevated while keeping its state as it is to form the raised bottom 1a. Then, in a downstream process, the outer-side wall portion 1c and the lower end portion of the body portion 2 are fixed by melting. Note that embodiments according to the present invention include a case where the fixing by melting is not performed in this downstream process.

Next, still another embodiment according to the present invention will be specifically described with reference to FIG. 11 through FIG. 13.

Figure 11:
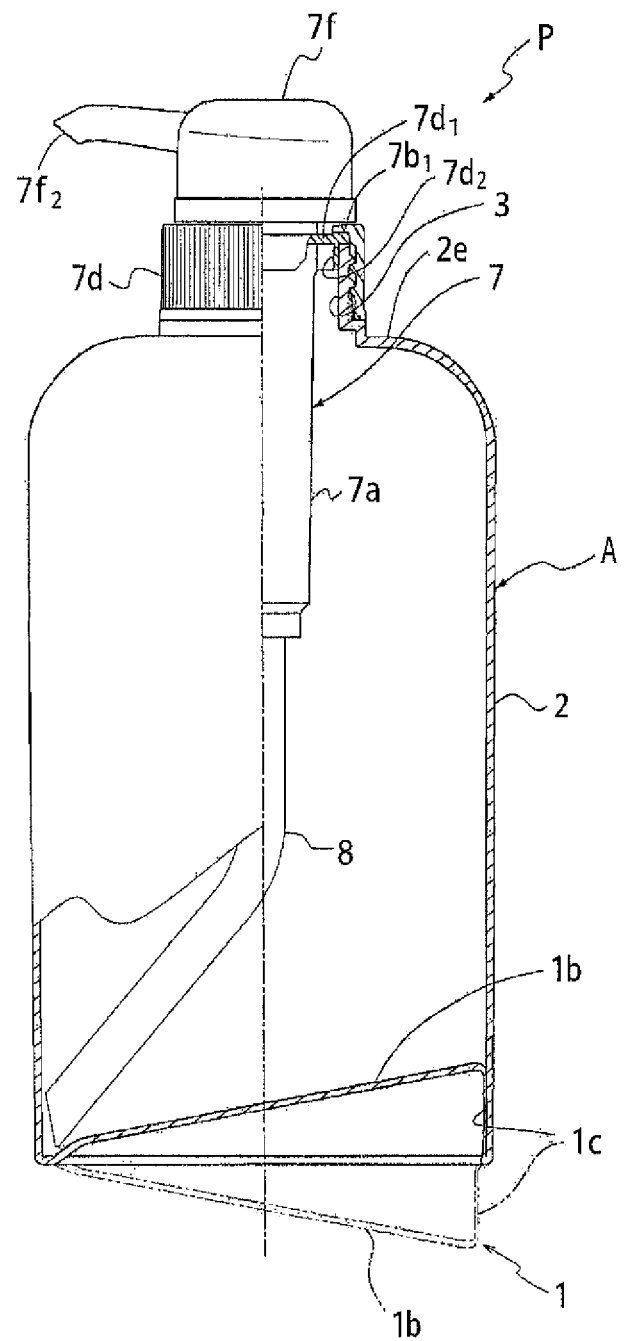
FIG. 11 is a vertical sectional view illustrating a container having a discharging device attached thereto in another embodiment of the synthetic resin container according to the present invention.
Figure 12:
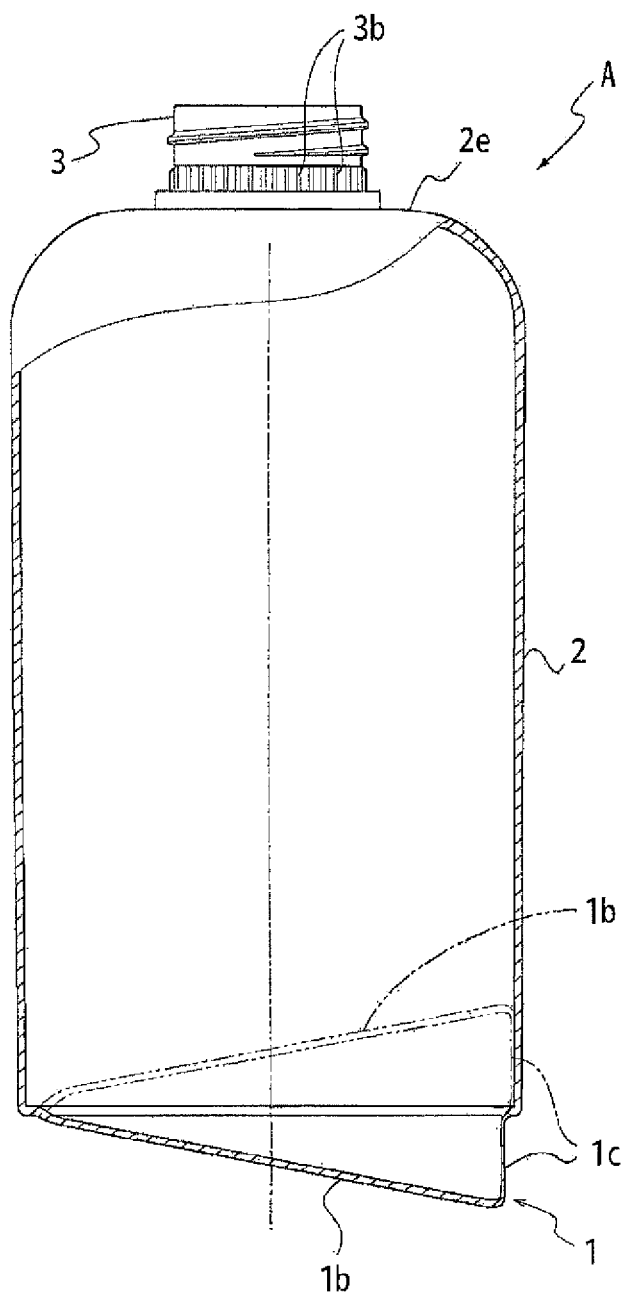
FIG. 12 is a vertical sectional view illustrating the synthetic resin container illustrated in FIG. 11 before the bottom portion of the container is inverted.
Figure 13:
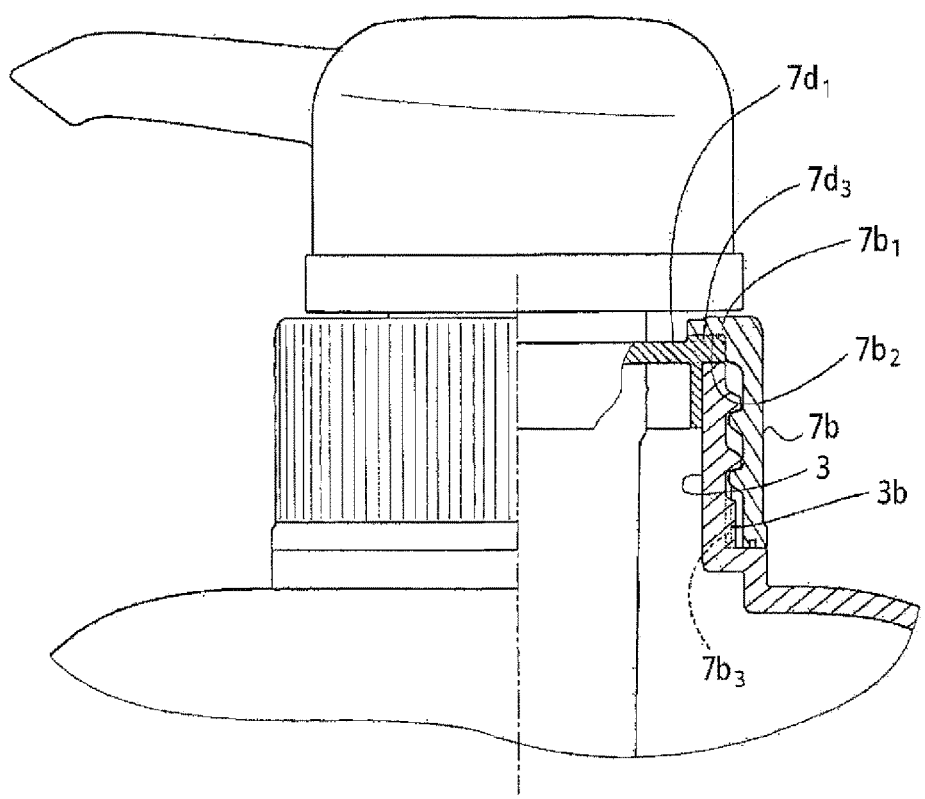
FIG. 13 is a main-portion expanded view illustrating the container having a discharging device attached to the synthetic resin container illustrated in FIG. 11.

FIG. 11 through FIG. 13 illustrate one example of a pump container P in which a discharging device 7 such as a pump is attached to a container body A. The container body A is formed integrally by the blow molding using synthetic resin, and stands upright from the upper end of a cylindrical body portion 2 via a shoulder portion 2e to a mouth and neck portion 3. At the lower end portion of the body portion 2, a raised-bottom-like slanting wall portion 1b extends by way of an outer-side wall portion 1c.

As illustrated in FIG. 12, the container A first includes a bottom wall 1 forming the bottom portion of the container, and the body portion 2 integrally connecting with the outer periphery of the bottom wall 1 and having a filling space for the content in the inner side thereof. More specifically, in FIG. 12, in the container body A, the outer-side wall portion 1c extends downward integrally from the lower edge of the body portion 2, and the slanting wall portion 1b extends integrally from the lower edge of the outer-side wall portion 1c.

As illustrated in FIG. 12, the outer-side wall portion 1c has a cylindrical shape, and is formed such that: a circular upper edge thereof has the same shape as the lower end edge of the body portion 2 has; a lower edge thereof has the same plan-view-shape as the lower end edge of the body portion 2 has and slants downward from one end portion of the lower end edge of the body portion 2 toward the opposing end portion; and, the outer surface thereof has substantially the same diameter as the inner surface of the lower end portion of the body portion 2 has. Further, the outer-side wall portion 1c has a thinner thickness than those of the body portion 2 and the slanting wall portion 1b.

The slanting wall portion 1b is formed in a slanting-plate shape, extending integrally from the lower end edge of the outer-side wall portion 1c, and closing the lower end opening portion of the outer-side wall portion 1c. When the outer-side wall portion 1c is inverted, the slanting wall portion 1b is inverted symmetrically with respect to a plane passing through the lower end edge of the body portion 2 to form the slanting wall portion 1b into a raised-bottom shape.

By pushing the rear portion of the slanting wall portion 1b upward from the state illustrated in FIG. 12, the outer-side wall portion 1c is inverted upward, and then, the outer surface of the outer-side wall portion 1c is inverted so as to be brought substantially into contact with the lower end portion of the inner surface of the body portion 2 as illustrated in FIG. 11. At this time, the slanting wall portion 1b pivots upward around the front end portion thereof to form the raised-bottom-like slanting wall portion 1b. Note that, when the slanting wall portion 1b is compared with the lower end opening of the body portion 2, the slanting wall portion 1b has a slightly larger size. However, by forcibly pushing the slanting wall portion 1b upward, it is possible to push the slanting wall portion 1b upward to the inverted position. As the container A made of the synthetic resin has resilience, such an operation can be easily performed.

The discharging device 7 includes: a flange $7d_1$ extending at the upper portion of the outer periphery thereof; a cylinder 7a having an annular seal tube $7d_2$ vertically extending from the peripheral edge portion of the undersurface of the flange $7d_1$; and, a base cap 7d fitted and fixed on the outer periphery portion of the flange $7d_1$. The base cap 7b has a flange-like top plate $7b_1$ extending inward from the upper end thereof, and the flange-like top plate $7b_1$ is fitted and fixed to the flange $7d_1$ by an engagement means so as not to be movable. The pressing head 7f is fitted to the upper end of a stem protruding at a position higher than the cylinder 7a in an energized state so as to be able to be pushed. A sucking pipe 8, upper end of which is fitted to the lower end portion of the cylinder 7a, is installed vertically. The sucking pipe 8 is formed in a bent shape such that the middle portion thereof is bent. Note that, as illustrated in the enlarged view of FIG. 13, the engagement means for the flange-like top plate $7b_1$ and the flange $7d_1$ is formed by a large number of radial protrusions $7d_3$ provided in the circumferential direction on the peripheral edge portion of the upper surface of the flange $7d_1$, and a large number of radial recessed grooves $7b_2$ provided in the circumferential direction on the undersurface of the flange-like top plate $7b_1$. By fitting the protrusions and the recessed grooves together, they are fixed so as not to rotate relative to each other. However, in place of this engagement, the cylinder 7a and the base cap 7b may be formed integrally.

Between a mouth and neck portion 3 and the base cap 7b, there is provided a positioning means for positioning, at the lowest position of the raised-like slanting wall portion 1b, an opening provided at the lower end of the bent sucking pipe 8 at the time of screwing the base cap 7b to the mouth and neck portion 3. The positioning means is formed by a part of a large number of vertical protrusions 3b provided at the lower end portion of the outer surface of the mouth and neck portion 3 at equal intervals in the circumferential direction, and a pair of engagement protrusions $7b_3$ protruding at an opposing position of the lower end portion of the inner surface of the base cap $7b$. Note that the vertical protrusions $3b$ constituting the positioning means are merely a part of the large number of the vertical protrusions. Therefore, it is not necessary to provide a large number of vertical protrusions $3b$ in the circumferential direction as described above, and it may be possible to set the vertical protrusions by the number corresponding to the number of the engagement protrusions.

At the time of attaching the discharging device 7 to the container body A, the base cap $7b$ is screwed to the outer surface of the mouth and neck portion 3 of the container while the cylinder $7a$ and the sucking pipe 8 are being installed vertically in the container body A, and the seal tube $7d_2$ is tightly fitted on the inner surface of the mouth and neck portion 3. A liquid sealing property at this portion is achieved by the seal tube $7d_2$. Further, when the screwing of the base cap $7b$ is completed, the engagement protrusions $7b_3$ on the inner surface of the base cap $7b$ are engaged between predetermined vertical protrusions $3b$ on the outer surface of the mouth and neck portion 3, and at this time, the opening at the top end of the sucking pipe 8 is placed at the lowest position of the raised-like slanting wall portion $1b$ as illustrated in FIG. 11. Note that FIG. 11 illustrates a state where the pressing head $7f$ is depressed, and a state where the pressing head $7f$ is screwed to the base portion $7a_2$ fitted on the upper end portion of the cylinder $7a$ as illustrated in detail in FIG. 3.

In the pump container having the configuration described above, the screwed state of the pressing head $7f$ is released from the state illustrated in FIG. 11 to elevate the pressing head $7f$, and then, the pressing head $7f$ is moved vertically from this state, whereby the liquid in the container body A is sucked from the opening at the lower end of the sucking pipe 8 using an operation of a built-in pump mechanism to discharge the liquid from the nozzle portion $7f_2$ of the pressing head $7f$.

Next, still another embodiment according to the present invention will be specifically described with reference to FIG. 14 through FIG. 18.

FIG. 14 through FIG. 18 illustrate one example of a pump container in which a discharging device 7 such as a pump is attached to a container body A. The container body A is formed integrally by the blow molding using synthetic resin, and stands upright from the upper end of a four-square-cylinder-like body portion 2 via a shoulder portion $2e$ to a mouth and neck portion 3. At the lower end portion of the body portion 2, a raised bottom $1b$ extends by way of an outer-side wall portion $1c$.

Figure 16:
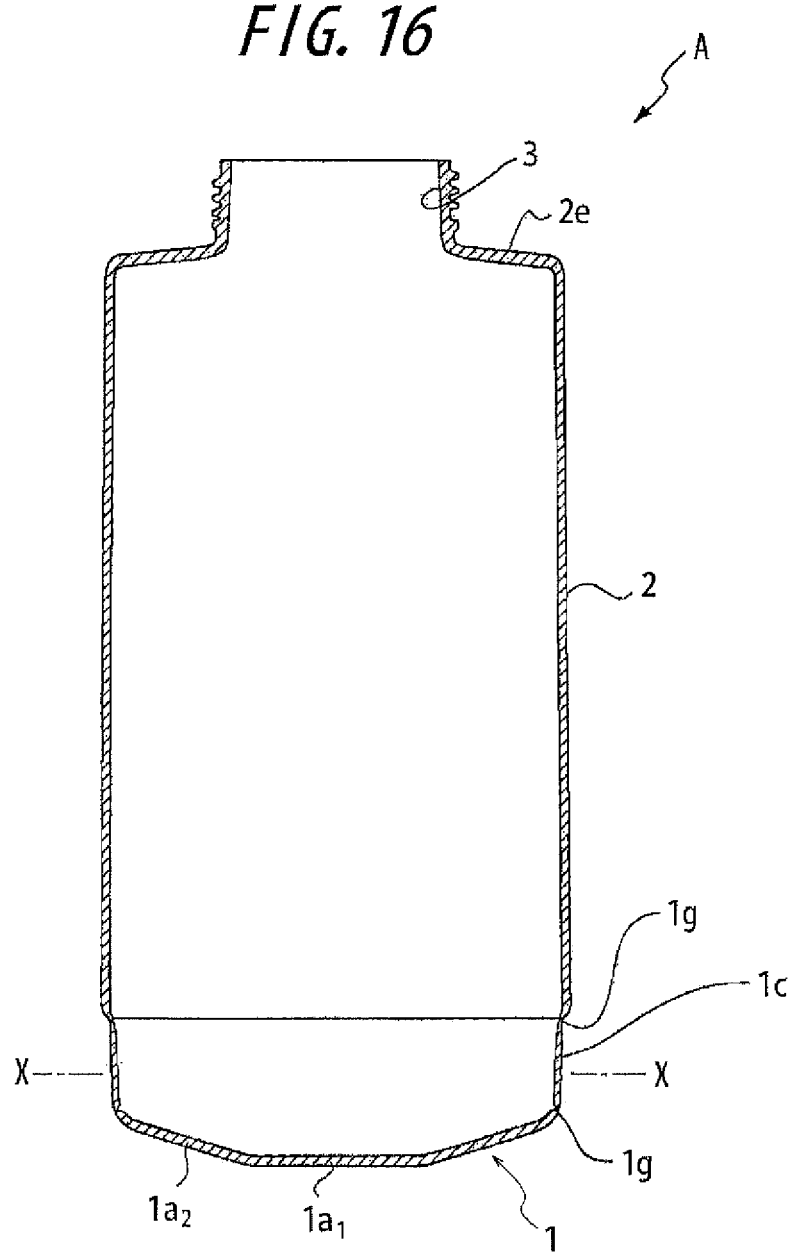
FIG. 16 is a vertical sectional view illustrating the synthetic resin container illustrated in FIG. 14 before the bottom portion is inverted.

As illustrated in FIG. 16, the container A first includes a bottom wall 1 for forming a bottom portion of the container, and a body portion 2 integrally connecting with the outer periphery of the bottom wall 1 and having a filling space for the content in the inner side of the container. More specifically, in FIG. 16, in the container body A, the outer-side wall portion $1c$ extends downward integrally from the lower edge of the body portion 2, and a wall for forming a raised bottom (formed by a liquid pool $1a_1$ and an inner-side wall portion $1a_2$) extends integrally from the lower edge of the outer-side wall portion $1c$.

Figure 17:
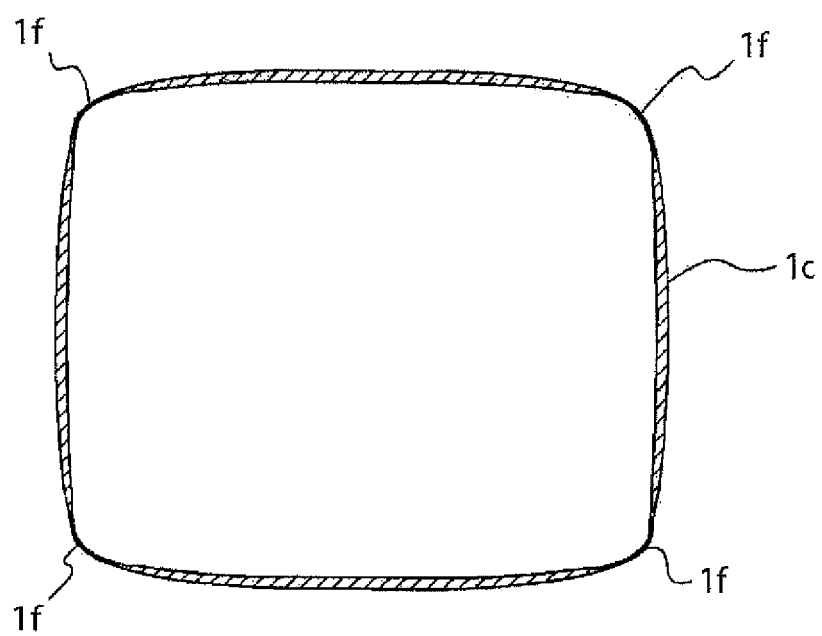
FIG. 17 is a horizontal sectional view taken along the line X-X in FIG. 16.

As illustrated in FIG. 17, the outer-side wall portion $1c$ has the same cylindrical shape as the body portion 2 has, in other words, has a four-square-cylinder-like shape, and the outer surface thereof has substantially the same diameter as the inner surface of the lower end portion of the body portion 2 has. Corner regions $1f$ are formed in a curved shape similar to corner regions of the body portion 2, and the corner regions $1f$ have a wall thickness thinner than the other portions of the outer-side wall portion $1c$ have. The outer-side wall portion $1c$ itself has a wall thickness thinner than a wall for forming a raised bottom has. A thin-thickness hinge $1g$ is annularly provided between the upper edge of the outer-side wall portion $1c$ and the lower edge of the wall for forming the raised bottom. Further, the thin-thickness hinge $1g$ is annularly provided between the lower edge of the outer-side wall portion $1c$ and the peripheral edge portion of the wall for forming the raised bottom.

The wall for forming the raised bottom extends integrally from the lower edge of the outer-side wall portion $1c$ and closes the opening portion at the lower end of the outer-side wall portion $1c$. At the central portion, there is provided a liquid pool $1a_1$ having a rectangular shape similar to the peripheral edge portion. Around the liquid pool $1a_1$, there is provided an inner-side wall portion $1a_2$ sloping down toward the inside. The inner-side wall portion $1a_2$ connects with the lower edge of the outer-side wall portion $1c$, and closes the opening portion at the lower end of the outer-side wall portion $1c$. When the outer-side wall portion $1c$ is inverted, the wall for forming the raised bottom is elevated to similarly form a raised bottom $1a$ having the liquid pool $1a_1$ and the inner-side wall portion $1a_2$.

Figure 14:
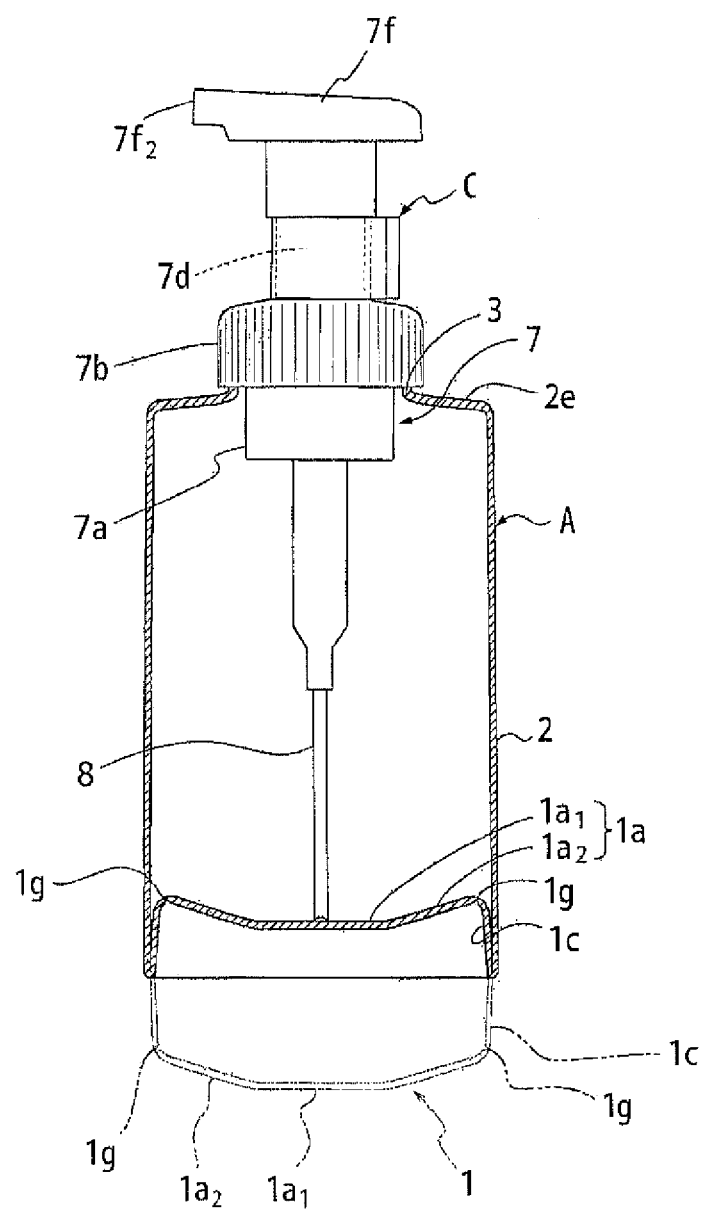
FIG. 14 is a vertical sectional view illustrating a container having a discharging device attached thereto in another embodiment of the synthetic resin container according to the present invention.
Figure 15:
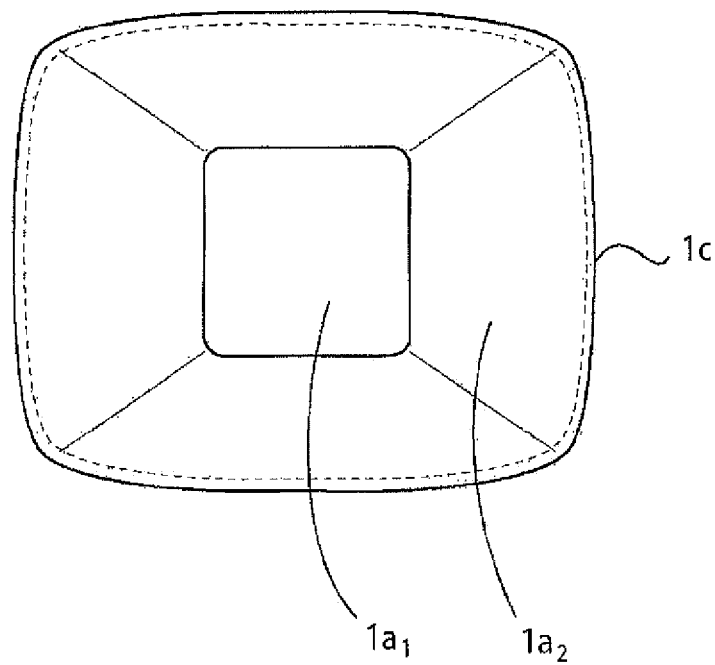
FIG. 15 is a bottom view of the synthetic resin container illustrated in FIG. 14.

By pushing the wall for forming the raised bottom upward with respect to the body portion 2 from the state illustrated in FIG. 16, the outer-side wall portion $1c$ is inverted upward, and then, the outer surface of the outer-side wall portion $1c$ is inverted so as to be brought substantially into contact with the inner surface at the lower end portion of the body portion 2 as illustrated in FIG. 14. At this time, the wall for forming the raised bottom is elevated while keeping its state as it is to form the raised bottom $1a$.

A discharging device 7 is fixed to a container body A by a base cap $7b$ fitted to the outer periphery of a mouth and neck portion 3; a cylinder $7a$ whose upper end portion is fixed to the base cap $7b$ is installed vertically in the upper portion of the container body A; and, a pressing head $7f$ is fitted to the upper end of a hollow stem $7d$ protruding at a position higher than the cylinder $7a$ in an energized state so as to be able to be pushed. Further, the lower end of a sucking pipe 8, upper end of which is fitted to the lower end portion of the cylinder $7a$, is installed vertically in a manner that an opening portion at the lower end of the sucking pipe 8 is disposed in the vicinity of the upper surface of the liquid pool $1a_1$. Note that C in the drawing represents a stopper for preventing the pressing head $7f$ from being unintentionally depressed.

In the pump container having the configuration described above, the stopper C is removed from the state illustrated in FIG. 14, and the pressing head $7f$ is vertically moved, whereby the liquid in the container body A is sucked from the opening at the lower end of the sucking pipe 8 using an operation of a built-in pump mechanism to discharge the liquid as foam from a nozzle portion $7f_2$ of the pressing head $7f$.

Figure 18:
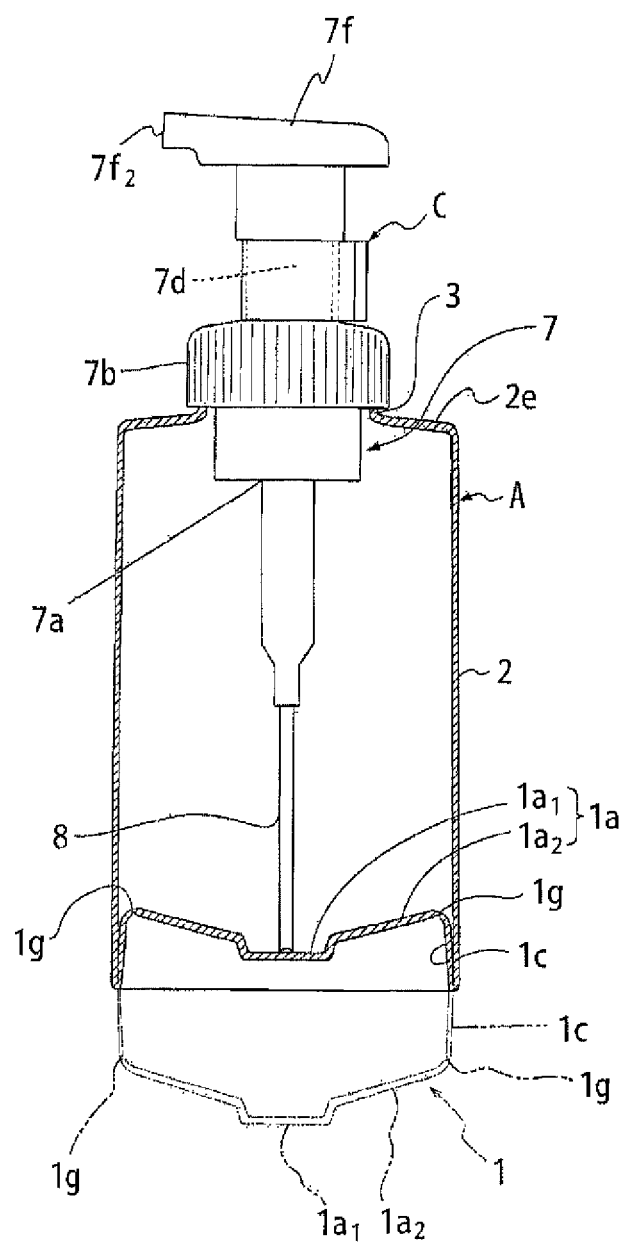
FIG. 18 is a vertical sectional view illustrating a container having a discharging device attached thereto in the other embodiment of the synthetic resin container according to the present invention.

FIG. 18 illustrates the other example, which is different from the example illustrated in FIG. 14 in that a wall for forming a raised bottom and a liquid pool $1a_1$ at the central portion of a raised bottom $1a$ form a recessed liquid pool portion. Since the other configurations are the same as those illustrated in the example in FIG. 14, the same reference characters are attached and explanations thereof are omitted.

It should be noted that the present invention is not limited to the embodiments described above, and it is possible to achieve the same effects as those described above even if constituting elements are mutually exchanged between the embodiments.

INDUSTRIAL APPLICABILITY

It is possible to provide a synthetic resin container including an inverting and folding back bottom wall and having an excellent usability capable of securing a stable self-standing position with high rigidity (especially buckling strength); completely discharging contents without accompanying complicated operations; being formed by a blow molding and the like; and maintaining the existing favorable productivity and low cost.

EXPLANATION OF REFERENCE CHARACTERS

1 Bottom wall
1*a* Raised bottom
1*a*$_1$ Liquid pool
1*a*$_2$ Inner-side wall portion
1*b* Slanting wall portion
1*c* Outer-side wall portion
2 Body portion
3 Mouth and neck portion
3*a* Threaded portion
4 Bending groove
5 Narrowed portion
5*a* Upper peripheral wall
5*b* Lower peripheral wall
6 Annular rib
7 Discharging device
7*a* Cylinder
7*b* Base cap
7*c* Piston
7*d* Hollow stem
7*e* Poppet
7*f* Pressing head
7*g* Spring
7*h* Valve body
8 Sucking pipe
9 Self-standing foot
10 Annular hollow portion
11 Rib M Filling space

What is claimed is:

1. A synthetic resin container having a bottom wall for forming a bottom portion of the container, and a body portion connecting integrally with an outer periphery of the bottom wall to define a space for filling a content therein, the bottom wall being inverted and folded back toward the inside of the body portion to form a raised bottom, wherein:
    the body portion has a cylindrical or elliptically cylindrical shape;
    the synthetic resin container is configured so that, prior to inverting the bottom wall:
        an outer-side wall portion having the same cylindrical shape as the body portion has is provided so as to extend downward from a lower edge of the body portion;
        a wall for forming the raised bottom is provided so as to extend from a lower edge of the outer-side wall portion; and
        the outer-side wall portion is formed so as to be invertible upward so that the bottom wall can fold inwardly at the lower edge of the body portion; and
    the synthetic resin container is configured so that, when the outer-side wall portion is inverted upward:
        an inner surface of the outer-side wall portion is brought into liquid-tight contact with a lower end of an inner surface of the body portion to form a self-standing foot, the raised bottom, and a liquid pool at the central portion of the bottom wall;
        at least a lower end of the body portion has a polygon-cylinder-like shape; and
        the liquid-tight contact is formed so that liquid cannot enter the self-standing foot.

2. The synthetic resin container according to claim 1, wherein each corner region of the outer-side wall portion has a wall thickness thinner than the other portions thereof have.

3. The synthetic resin container according to claim 1, wherein each corner region of the outer-side wall portion is formed in an arcuately curved shape.

4. The synthetic resin container according to claim 1, wherein upper and lower edge portions of the outer-side wall portion are connected via a thin hinge with a lower edge of the body portion and a peripheral edge of the wall for forming the raised bottom, respectively.

* * * * *